United States Patent
Maistrello et al.

(10) Patent No.: US 12,486,586 B2
(45) Date of Patent: Dec. 2, 2025

(54) SEPARATORS FOR GASEOUS PRODUCTS IN OXOCARBON ELECTROLYZERS

(71) Applicant: Dioxycle, Saint Ouen sur Seine (FR)

(72) Inventors: Jonathan Maistrello, La Garenne Colombes (FR); David Wakerley, Paris (FR); Sarah Lamaison, Paris (FR); Paul S Wallace, Austin, TX (US); Raphaël Sanjuan, St Maur des Fossés (FR); Joshua A. Rabinowitz, San Francisco, CA (US); Fanny Bétermier, Paris (FR)

(73) Assignee: Dioxycle, Saint Ouen sur Seine (FR)

( * ) Notice: Subject to any disclaimer, the term of this patent is extended or adjusted under 35 U.S.C. 154(b) by 0 days.

(21) Appl. No.: 19/054,351

(22) Filed: Feb. 14, 2025

(65) Prior Publication Data
US 2025/0263854 A1    Aug. 21, 2025

Related U.S. Application Data

(60) Provisional application No. 63/554,907, filed on Feb. 16, 2024, provisional application No. 63/667,749, (Continued)

(51) Int. Cl.
*C25B 3/03* (2021.01)
*C25B 1/02* (2006.01)
(Continued)

(52) U.S. Cl.
CPC .............. *C25B 9/67* (2021.01); *C25B 1/02* (2013.01); *C25B 1/23* (2021.01); *C25B 3/03* (2021.01);
(Continued)

(58) Field of Classification Search
None
See application file for complete search history.

(56) References Cited

U.S. PATENT DOCUMENTS

3,766,027 A * 10/1973 Gregory .................... C10L 3/08
                                                      205/462
4,019,879 A    4/1977 Rabo et al.
(Continued)

FOREIGN PATENT DOCUMENTS

CN    116536678 A *  8/2023 .............. C25B 1/23
EP    0129444 A2    12/1984
(Continued)

OTHER PUBLICATIONS

Machine translation of CN 116536678 A (Year: 2023).*
(Continued)

*Primary Examiner* — Harry D Wilkins, III
(74) *Attorney, Agent, or Firm* — Daylight Law, P.C.

(57) ABSTRACT

This disclosure relates to systems and methods for gas separation in oxocarbon electrolyzers. A disclosed method includes supplying an oxocarbon to an input stream of a cathode chamber of an oxocarbon electrolyzer, converting the oxocarbon to a product gas in the cathode chamber, obtaining an output stream, with the product gas and residual oxocarbon, from the oxocarbon electrolyzer, and recycling a portion of the product gas, from the output stream, to the input stream.

27 Claims, 10 Drawing Sheets

Related U.S. Application Data filed on Jul. 4, 2024, provisional application No. 63/675,255, filed on Jul. 24, 2024.

(51) Int. Cl.
    *C25B 1/23*     (2021.01)
    *C25B 3/26*     (2021.01)
    *C25B 9/67*     (2021.01)
    *C25B 15/021*     (2021.01)
    *C25B 15/029*     (2021.01)
    *C25B 15/08*     (2006.01)

(52) U.S. Cl.
    CPC .............. *C25B 3/26* (2021.01); *C25B 15/021* (2021.01); *C25B 15/029* (2021.01); *C25B 15/083* (2021.01); *C25B 15/087* (2021.01)

(56) References Cited

U.S. PATENT DOCUMENTS

| | | | |
|---|---|---|---|
| 5,245,099 | A | 9/1993 | Mitariten |
| 6,303,841 | B1 | 10/2001 | Senetar et al. |
| 6,867,166 | B2 | 3/2005 | Yang et al. |
| 7,537,742 | B2 | 5/2009 | Baksh et al. |
| 2021/0381116 | A1 | 12/2021 | Kashi et al. |
| 2023/0175146 | A1 | 6/2023 | Kashi et al. |
| 2025/0109513 | A1* | 4/2025 | Huo ................ C25B 15/081 |
| 2025/0215585 | A1* | 7/2025 | Sargent ................ C25B 3/07 |

FOREIGN PATENT DOCUMENTS

| | | |
|---|---|---|
| EP | 3165504 A1 | 5/2017 |
| WO | 2015082130 A1 | 6/2015 |

OTHER PUBLICATIONS

M. Ramdin, et al. (2021). Electroreduction of CO2/CO to C2 Products: Process Modeling, Downstream Separation, System Integration, and Economic Analysis. Industrial & Engineering Chemistry Research, 60, 17862-17880.

International Search Report and Written Opinion dated Aug. 4, 2025 from International Application No. PCT/IB2025/051654, 15 pages.

A. L. Gosman (1967). Thermodynamic properties of argon from the triple point to 300 K at pressures to 1000 atmospheres. Washington, DC: National Bureau of Standards.

A. Ouadha et al. (2005). Exergy analysis of a two-stage refrigeration cycle using two natural substitutes of HCFC22. International Journal of Exergy, 2(1), 14-30. https://doi.org/10.1504/IJEX.2005.006430.

F. M. Meggers et al. (2010). The missing link for low exergy buildings: Low temperature-lift, ultra-high COP heat pumps. In Proceedings of CLIMA 2010: Sustainable Energy Use in Buildings (Antalya, Turkey, May 9-10, 2010).

Linde Engineering. Hydrogen Recovery by Pressure Swing Adsorption. Available at: https://assets.linde.com/-/media/global/engineering/engineering/home/products-and-services/process-plants/adsorption-and-membrane-plants/hydrogen-recovery-and-purification/ha_h_1_1_e_09_150dpi_nb.pdf.

Linde Engineering. Hydrogen. H2/1/1/E/12. Available at: https://assets.linde.com/-/media/global/engineering/engineering/home/products-and-services/process-plants/h2_1_1_e_12_150dpi_nb.pdf.

Tempest Engineering. (n.d.). Ammonia chillers—Natural refrigeration. Retrieved Apr. 22, 2025, from https://tempest-eng.com/chillers/ammonia-chillers/.

* cited by examiner

SEPARATORS FOR GASEOUS PRODUCTS IN OXOCARBON ELECTROLYZERS

CROSS REFERENCE TO RELATED APPLICATIONS

This application claims the benefit of U.S. Provisional Patent Application No. 63/554,907 as filed on Feb. 16, 2024, U.S. Provisional Patent Application No. 63/667,749 as filed on Jul. 4, 2024, and U.S. Provisional Patent Application No. 63/675,255 as filed on Jul. 24, 2024, all of which are incorporated by reference herein in their entireties for all purposes.

BACKGROUND

There is an urgent need to develop technologies that make the capture or valorization of oxocarbons more economical in highly emitting sectors of the economy. Furthermore, there is an urgent need to reduce emissions related to the production of useful fuels and chemicals in our society and to find alternative ways to produce such fuels sustainably instead of relying on fossil resource extraction and processing for their production. Accordingly, technologies that both generate useful fuels and chemicals while simultaneously utilizing oxocarbon feedstocks that would otherwise have been emitted into the atmosphere are critically important. These technologies not only reduce net emissions but also create economic value by offsetting the costs of oxocarbon capture and conversion through the production of valuable chemicals.

Several economically beneficial methods exist for the conversion of oxocarbons such as carbon monoxide and carbon dioxide into more valuable species. The produced gaseous species often include valuable hydrocarbons that are mixed with unconverted oxocarbon and hydrogen. A highly valuable hydrocarbon such as ethylene must be purified to meet stringent specifications required for its use in downstream processes such as, for instance, polymerization. Achieving these purity levels requires effective separation techniques to remove impurities and unreacted feed gases from one or more product gases. As the demand for high-purity gas products grows, there is a need to develop hybrid separation strategies that integrate multiple techniques to optimize both efficiency and purity but remain cost-effective.

SUMMARY

This disclosure relates to systems and methods for gas separation in oxocarbon electrolyzers. Oxocarbon electrolyzers rarely achieve total conversion of the incoming oxocarbon to a desired product. To reach a near 100% conversion rate, the unconverted oxocarbon must be separated downstream of the electrolyzer and recycled upstream back to the electrolyzer input. In traditional gas reactor processes, the product gases are generally separated out from the feedstock gases (e.g., oxocarbons) before the feedstock is recycled upstream back to the reactor. However, in specific embodiments of the inventions disclosed herein, systems and methods are provided which recycle product gas from the output stream of the oxocarbon electrolyzers back to the input of the oxocarbon electrolyzers which produces significant benefits. This recycling can be a recycling of various gas mixtures from various points of the output stream in different embodiments of the invention. Various gas mixtures from various points in the output stream can be recycled simultaneously. In specific embodiments, independent control of the amount of gas recycled from each point allows fine-tuning of the gas mixture at the electrolyzer input. The gas mixtures which are recycled can include unreacted oxocarbons. The gas mixtures which are recycled can include other gases which do not negatively impact the performance of the oxocarbon electrolyzers. Sensors can be used to determine gas composition at various points in the input and output streams, which allows for changing the amounts of gas recycled at various points using gas composition data to dynamically adjust input and output compositions and pressures.

Recycling product gases from the output of an oxocarbon electrolyzer back to the input would generally be considered undesirable as it would be a waste of energy, and it would make the product reaction in the oxocarbon electrolyzer less energetically favorable. However, the inventors have discovered that recycling the product gas back to the input of an oxocarbon electrolyzer can increase the efficiency of the electrolyzer by limiting excessive oxocarbon exposure to the catalyst. In many instances this can unexpectedly improve the product selectivity of the catalyst towards a desired feedstock. Excessive oxocarbon exposure refers to exposing the catalyst to more oxocarbon than the catalyst can assist in reacting at a given time, which leads to the formation of undesirable by products. Limiting the partial pressure of oxocarbon at the catalyst surface can suppress undesirable side reactions. Using the approaches disclosed herein, these benefits can be realized without the addition of other inert filler gases that would need to be later separated from desired products with additional costly separation stages.

In specific embodiments of the invention, different separators can operate on the output stream of the oxocarbon electrolyzers disclosed herein to separate out product gases from the output stream. For example, the separators can be membrane separators, temperature swing adsorption separators, pressure swing adsorption separators, cryogenic separators, lean oil separators, or other separators. Additional gas/liquid separators can also be present in the system. In specific embodiments, multiple types of separators can be included in the separation system, or even within a single separator stage. In specific embodiments, the separators that operate on the output stream will be separators that exhibit increased efficiency when the concentration of the product gas in the output stream increases. For example, membrane separators and cryogenic separators work more efficiently, with less compression required, when the percentage of product gas is higher compared to the unreacted gas or other product gases in the input to the separator. Accordingly, specific separators benefit from the concept of operating an oxocarbon electrolyzer while recycling product gas from the output stream, in order to decrease the relative percentage of the unreacted gas in the oxocarbon electrolyzer, which leads to an increase in the concentration of the product gas in the output stream.

In specific embodiments of the invention, a method is provided. The method includes supplying an oxocarbon to an input stream of a cathode chamber of an oxocarbon electrolyzer, converting the oxocarbon to a product gas in the cathode chamber, obtaining an output stream, with the product gas and residual oxocarbon, from the oxocarbon electrolyzer, and recycling a portion of the product gas, from the output stream, to the input stream.

In specific embodiments of the invention, a system is provided. The system includes an oxocarbon electrolyzer having a cathode chamber, wherein the oxocarbon electrolyzer is configured to reduce an oxocarbon in an input stream to a product gas, a supply configured to introduce the oxocarbon into the input stream, and an output of the oxocarbon electrolyzer with an output stream. The output stream includes the product gas and residual oxocarbon. The system also comprises a recycle conduit configured to recycle a portion of the product gas, from the output stream, to the input stream.

In specific embodiments of the invention, another method is provided. The method includes supplying an oxocarbon to an input stream of a cathode chamber of an oxocarbon electrolyzer, reducing the oxocarbon at a cathode electrode of the oxocarbon electrolyzer under conditions effective to produce a first product gas and a second product gas in the cathode chamber, obtaining an output stream from the oxocarbon electrolyzer comprising the first product gas, the second product gas, and residual oxocarbon, supplying the product gases and residual oxocarbon to a separator system, and recycling a portion of the product gases from one or more outputs of the separator system to the input stream.

BRIEF DESCRIPTION OF THE DRAWINGS

The accompanying drawings illustrate various embodiments of systems, methods, and various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Methods and systems related to oxocarbon electrolyzers and separators in accordance with the summary above are disclosed in detail herein. The electrolyzers used in accordance with the approaches disclosed herein can have various architectures. The electrolyzer can include an anode area and a cathode area. An oxocarbon can be provided to the cathode area of the electrolyzer as a reduction substrate. Useful chemicals can be produced in the cathode area, in the anode area, or in a separating area located between the cathode area and the anode area of the electrolyzer.

Figure 1:
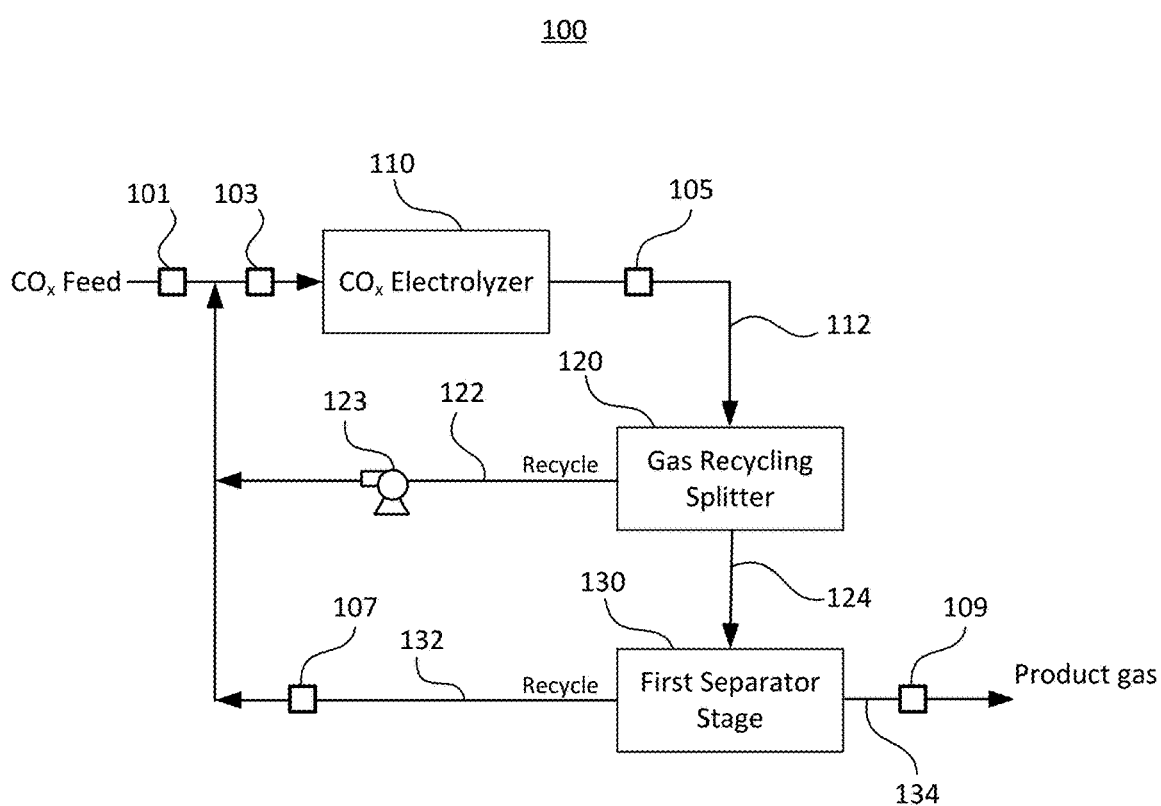
FIG. 1 provides a diagram of an oxocarbon electrolyzer system in accordance with specific embodiments of the inventions disclosed herein.

FIG. 1 illustrates an electrolyzer system 100 designed for the conversion of oxocarbon species into valuable products according to specific embodiments of the invention. System 100 incorporates separation stages and gas recycling to enhance efficiency and purity of various products. The system begins with an oxocarbon feed gas that is directed to the input stream of an electrolyzer 110, where the electrolytic conversion of oxocarbons occurs to form desired products, such as ethylene, and additional products, such as hydrogen. The stream 112 output from the electrolyzer 110 proceeds to a gas recycling splitter 120. Here, unreacted oxocarbon and intermediate products are split; a portion is directed back via a recycle stream 122 to re-enter the electrolyzer. The recycle stream 122 can be directed toward the electrolyzer input stream using a recycle blower 123, or else using a pump, differential pressure in the system, or through other means. The remaining output stream 124 from the splitter 120 is directed to a first separator stage 130, which further purifies the product gas by removing residual reactants or unwanted by-products. A secondary recycle stream 132 recirculates unconverted materials from the separator back to the electrolyzer input stream, ensuring minimal waste. The secondary recycle stream 132 can be driven by another recycle blower but might also be driven by output pressure after the first separator stage 130. The final purified product gas exits the system via product stream 134, ready for downstream applications, storage, or other valorization. This closed-loop design emphasizes sustainability by conversion of all or nearly all of input feedstock while maintaining high product selectivity and purity at the outputs. In specific embodiments, recycle loops can be combined earlier and motivated toward the electrolyzer input stream together. In specific embodiments, recycle loops can be mixed separately with the input feed near the input stream. In specific embodiments, the separator stage can contain more than one separator element. In these cases, recycle streams can be extracted from intermediate elements within the separator stage and recycled back to the input stream.

In specific embodiments, the system 100 can include various sensors around the system to monitor reaction conditions and various other parameters. Sensors can collectively enable real-time monitoring, control, and optimization of the system. Sensors can include, but are not limited to gas composition sensors, pressure transducers, mass or volumetric gas flow meters, and temperature sensors. In the example of FIG. 1, sensor elements can be placed at different points around the system; some examples are an oxocarbon feed line sensor element 101, a mixed electrolyzer input stream sensor element 103, an electrolyzer output stream sensor element 105, a recycle stream sensor element 107, and a product gas sensor element 109. Sensor elements can contain one or several types of sensors based on desired outputs and acceptable parameters. For example, in an oxocarbon electrolyzer, the input feed gas could consist of pure $CO_2$, pure CO, or the input feed may be a gas mixture that is stable. In these cases, there may be less need of constant monitoring of gas composition, but instead there may only be a need for temperature and pressure readings at sensor element 101. In some cases, the input feed may be a syngas (containing hydrogen gas and carbon monoxide (CO) along with other impurities) or other mixture that is the output of a different process. The optimal electrolyzer feed gas composition depends on many operating variables and on the commercial objectives (e.g., product slate, electrolyzer operating costs, electrolyzer component life, and the like). The CO-rich feed gas can come from various sources that produce different CO-rich feed gas compositions. It would be desirable to be able to adjust the composition of the electrolyzer feed gas by recycling multiple streams from the gas processing system. There, continuous or periodic gas composition readings can be taken so that the system can respond dynamically to changing conditions. The system can be configured to adjust various recycle streams to set the mol % of CO in the input stream to a target level. In some embodiments, there is an acceptable range of values where the mol % of CO in the input stream may be allowed to vary and still provide acceptable conversion efficiency of the electrolyzer. For example, in specific embodiments, the system is designed so that there is greater than 5 mol % of product gas in the input stream of the electrolyzer and less than 50 mol % of oxocarbon in the input stream of the electrolyzer. The 5 mol % of product gas in the input stream of the electrolyzer can lead to an increase in the performance of downstream separators as will be described in the description and examples below. Furthermore, the less than 50 mol % of oxocarbon in the input stream of the electrolyzer can lead to an increase in the faradic efficiency of the electrolyzer for a desired product gas an other benefits as will be described in the description and examples below.

In specific embodiments, input stream sensor element 103 can be used to determine gas composition right at the input of the electrolyzer. This can vary from the composition in the input feed, as gas at this point can also consist of recycled gas flows or other inert gases. In specific embodiments, output stream sensor element 105 can measure composition of the output gas directly after the electrolyzer. This can help determine electrolyzer efficiency of conversion of the oxocarbon input to a desired product and can also determine levels of additional gas products created such as hydrogen gas, as well as those produced from other side reactions that may occur in the electrolyzer. In specific embodiments, similar sensors such as sensor elements 107 and 109 can measure outputs of a separator stage, such as product gas purity levels at sensor element 109, or retained gas composition at sensor element 107. Other positions of sensor elements are possible as well. For example, a first separator stage 130 may include more than one separator element. Various sensors can be included between these elements within a separation stage to determine separation efficacy, for example. Also, certain system elements can have their own sensors essential to their operation that can add to overall system data. For instance, operating voltages and/or currents are commonly measured at oxocarbon electrolyzer 110. This can be combined with other sensor data to calculate faradaic efficiencies for various products, for example.

In specific embodiments, certain sensors or sensor types can be omitted from the system at different positions. In specific embodiments, specific parameters can be either measured directly with a dedicated sensor for measuring the parameter at a given location, or indirectly with a sensor for measuring a parameter that is determinative of the desired parameter either at the same location or a different location in the system. For example, if product gas remains consistent over long periods, then the gas composition may not need to be sampled within the system; it may be sufficient to occasionally test samples of output gases by other means. In other cases, some gas levels can be dependent upon other parts of the process and may not need to be measured directly. For example, pressure and gas composition could be measured at sensor element 105. Based on the relative composition of a product gas in the output stream at sensor element 105, the composition of gases at the input stream at sensor element 103 could be derived based on known historic values as measured previously. In some cases, the values do not need to be calculated; various parameters such as recycling volume from one or more stages could be changed in response to amounts present of the electrolyzer output stream gas output. In other cases, the flow of gas at the input as well as the mass of one or more product gases in the system output can be used to calculate system efficiency without measuring intermediate levels. In another example, if the composition of the oxocarbon input feed remains constant, it can be sufficient to only monitor the gas composition after mixing with recycle gases at sensor element 103.

In specific embodiments, various control schemes can be used that can adjust not only purity of product gases but also improve conversion efficiency of the electrolyzer based on various sensor data. One explicit control is gas recycling splitter 120, which sets the percentage of gas in the output stream 124 that is routed for product gas separation, and how much is immediately recycled via recycle stream 122 to the input stream of the electrolyzer. The recycle stream 122 contains the same composition of gases that are directly output from the electrolyzer at stream 112, as no attempt was made to separate various gases from one another at this point. Recycle stream 132 may largely consist of unreacted oxocarbon gas but can also contain a significant amount of product gases depending on the nature of the separation techniques. In some embodiments, additional control valves can be placed on this recycle stream 132 as well to determine if the stream is fully recycled or if some or all the recycled gas should be purged from the system. In the example of FIG. 1, if all of the recycle stream 132 is returned to the electrolyzer input stream, the amount directly recycled in recycle stream 122 can be adjusted both at the gas recycling splitter 120 as well as by the recycle blower 123. By changing the amount of gas directly recycled, the composition of the gas mixture at sensor element 103 can be changed dynamically in response to changing conditions, for example, to adjust the partial pressure of the oxocarbon in the electrolyzer input stream while maintaining a desired overall pressure in the electrolyzer.

It is often less desirable to supply a pure oxocarbon as the input to an oxocarbon electrolyzer. As an example, a system that reduces CO to ethylene will be discussed. Pure CO on a cathode catalyst can overload the catalyst and/or the electrode; this can reduce the effectiveness of the catalyst over time. Electrodes are commonly gas-diffusion electrodes, which rely on a balance at the gas/liquid interface. High partial pressure of CO can lead to unwanted side reactions at the electrode surface, which could cause a problem if separators are not designed for these unwanted species, along with reducing selectivity for desired products. Generally speaking, a low partial pressure of CO (which may otherwise be indicated by low mol %) leads to superior selectivity for ethylene formation. The range of acceptable partial pressures ($p_{CO}$) of CO depends on the absolute pressure in the electrolyzer, For example, a $p_{CO}$ of 0.2 bar would be effective at 1 bar $P_{total}$(20 mol $\%_{CO}$) and a $p_{CO}$ of 2 bar would show favorable activity at 10 bar $P_{total}$(20 mol $\%_{CO}$). Finally, electrolyzers with gaseous inputs can suffer from reduced efficiency if there is not sufficient mass transport through the system, particularly at the electrode where sufficient mass transport serves to clear the surface and bring new reactants to the proper location. The CO mass transport to the cell must therefore be maintained at a level higher than the theoretical minimal demand of the electrolysis reaction for a given current (which is directly proportional to the rate of CO consumption).

Adding additional gas to the input flow can ameliorate many of the preceding problems. One approach is to mix an incoming oxocarbon with an inert gas such as nitrogen or argon to set the percentage of oxocarbon along with total pressure and gas flow rate to desired levels in the input mixture. However, this is less effective in specific embodiments of the current invention. Nitrogen may already be present in small amounts in the input feed. When it does not appreciably react, it can build up in the system, and at higher levels, it can become less inert and participate in unwanted side reactions. Argon might not react in the system, but as with any other inert gas, it will still need to be removed from the output to produce a pure source of product gas. Added gases to the system can lead to additional separation steps and apparatus that would add to the total cost of operation, even if they can be recycled within the system. Compression or heating/cooling of unused gases presents an additional cost when processing the electrolyzer output gases for product gas separation.

Increasing the CO-rich input gas flow to improve mass transport does not solve the problem either. While it does contribute to producing sufficient mass transport, adding more CO increases problems where the partial pressure of CO is too high as previously mentioned and also lowers the percentage of final product gases in the output. This is because overall reactivity in the electrolyzer may only be marginally increased when increasing the level of oxocarbon to be converted, leading to more unreacted gas passing through the electrolyzer. Accordingly, separation stages that are more efficient when the product gas concentration is higher in the output steam will decrease in efficiency as more CO is used in the input stream.

Contrary to expectations, the inventors have discovered that recycling product gases along with unreacted oxocarbons back into the input stream of the electrolyzer can lead to a proper pressure and mole percentage of CO into the electrolyzer with benefits as outlined previously. Previously, it was thought that introducing product gases into the input would diminish the reactivity of the catalyst and also make the desired oxocarbon conversion reaction less thermodynamically favorable. However, on the first point, catalyst activity remains high unless product gases are present at large concentrations. On the second point, while it is true that the net oxocarbon reaction is somewhat less energetically favorable, this is balanced by improved gas flow increasing the overall efficiency of the electrolyzer. Separation costs are also reduced by several factors. First, without addition of inert filler gases into the flow, fewer separation steps are needed as product gases were already being mostly separated from the output mixture. Second, as mentioned earlier, certain separation steps are more efficient when the level of product gas to be purified is higher. When a portion of a product gas is recycled back to the input of the electrolyzer and passes through to the output, this produces an increase in the level of the product gas for separation without requiring improvements to electrolyzer efficiency or other concentration processes. Finally, when directing product gases back to the electrolyzer to act in the place of inert filler gases, other advantages become apparent. In systems as provided herein, highly pure product gases are required at the output. In systems where it is desired to convert as much of the oxocarbon as possible to products, if recycling of product gases is to be avoided, then much more careful separation must take place first, where the overall permeate and retentate streams of the final product gas must ensure both a pure product as well as a nearly pure unreacted oxocarbon stream. This may require additional separation steps, or else may involve higher pressures or temperatures. By allowing some product gas to stay with the oxocarbon in the retentate streams, separator specifications can be relaxed. This schema still produces highly pure product gases but may use less energy and be more cost-effective both to implement and operate.

In specific embodiments, the ratio of product gases used as recycled filler gases in the electrolyzer with respect to each other can be chosen to optimize electrolyzer performance and efficiency. In other embodiments, the electrolyzer performance may be relatively insensitive to the mix of product gases used; in this case, the amount of product gases relative to the oxocarbon level can be the most important factor.

In some electrolyzer systems, additional products can be produced at the electrolyzer along with the primary conversion product of the oxocarbon. One common additional product gas is hydrogen. Hydrogen evolution can occur as a competing side-reaction from water or hydrogen ions at the cathode along with oxocarbon reduction. Though this can be minimized by proper selection of catalyst and setting of reaction conditions, it is difficult to eliminate. However, hydrogen itself can be a valuable product as well. In some embodiments, catalysts can be chosen to improve the efficiency of the hydrogen evolution reaction, and separators chosen to produce hydrogen as a secondary product. In addition, the output of the electrolyzer often contains a liquid phase that may also contain valuable products derived from the oxocarbon. In specific embodiments, lowering the partial pressure of the oxocarbon by adding product gases back to the input while targeting a given overall pressure can affect the selectivity of reactions that create liquid phase products. For example, alcohols and carboxylates can be created as additional conversion products from the oxocarbon at the cathode. If these liquid phase products are less desired than gaseous products, a lower partial pressure of the oxocarbon at the electrolyzer input can reduce the selectivity of the reactions creating alcohols and/or carboxylates, and thus increase the output of the gaseous conversion products.

Figure 2:
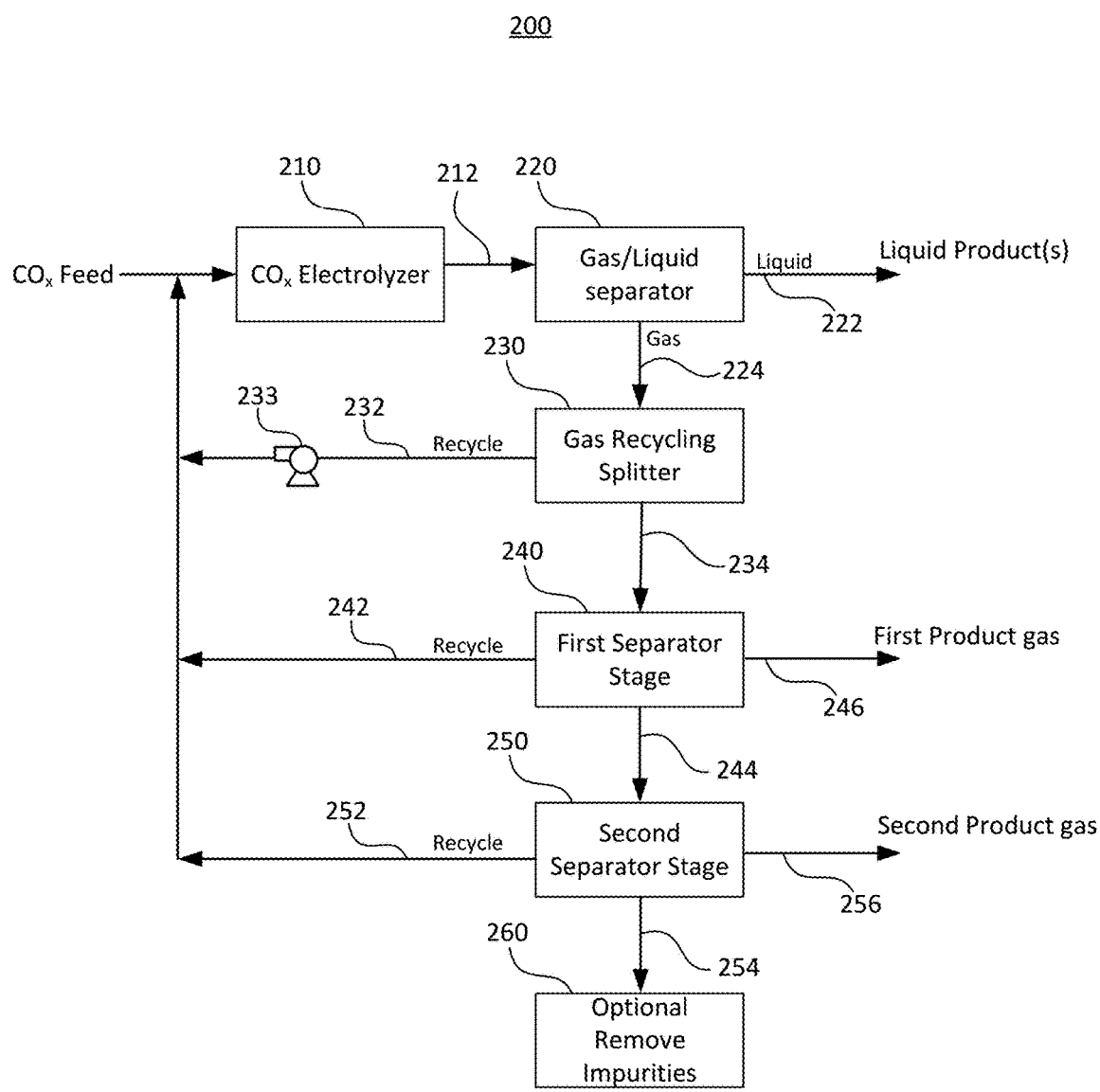
FIG. 2 provides a diagram of an oxocarbon electrolyzer system with a multistage separator in accordance with specific embodiments of the inventions disclosed herein.

FIG. 2 illustrates an electrolyzer system 200 designed for the conversion of oxocarbon species into valuable products according to specific embodiments of the invention. Similar to system 100, system 200 incorporates separation stages and gas recycling to enhance efficiency and purity of various products but also discloses portions for separating out additional gas and liquid products. System 200 contains many similar portions as shown in system 100. For example, system 200 can also contain many sensor elements throughout the system for similar purposes as mentioned previously. Such sensor elements are not shown in FIG. 2 for clarity but can similarly be used to control different aspects of input, output, and intermediate flows.

The system 200 begins with an oxocarbon feed gas that is directed to the input stream of an electrolyzer 210, where the electrolytic conversion of oxocarbons occurs to form desired products, such as ethylene, and additional products, such as hydrogen. The output stream from the electrolyzer 212 can optionally proceed to a gas/liquid separator 220. There can be liquid phase products present in the output stream, such as alcohols or carboxylic acids/carboxylates. However, even if these are not present, there may be excess water that should be removed first before later gas separation stages. Liquid separation can occur using a variety of methods, for example, simple liquid traps, knockout drums, centrifugal cyclone separators, membrane separators which allow gases to permeate readily, or a cooling condensation scrubber. A condensation scrubber can be implemented using direct heat exchange or as a pumparound condenser. In specific embodiments, when a pumparound condenser is used, an optional atmospheric distillation column can be added to separate alcohols or ammonia from the condensed scrubbing water, which can be returned to the condenser. Additional gases from this distillation column can be routed to the gas recycle stream that leads to the electrolyzer input stream. The liquid phase 222 can be directed for separation of useful products using other methods. In some embodiments, water and possibly recovered electrolytes can be returned to the electrolyzer liquid flow.

The output stream 224, now gaseous, is sent to a gas recycling splitter 230. Here, unreacted oxocarbon and intermediate products are split; a portion is directed back via a recycle stream 232 to re-enter the electrolyzer. The recycle stream 232 can be directed toward the electrolyzer input stream using a recycle blower 233, or else using a pump, differential pressure in the system, or through other means. In some embodiments, the gas recycling splitter 230 can be implemented between elements of the gas/liquid separator 220. In some systems, after gas/liquid separation, there remain traces of water and other liquid products. Thus, an additional liquid separator, for example, a temperature swing adsorber (TSA), can be used to remove remaining water and liquid products before the gas separation stages. Normally, the splitter 230 is used after the first liquid removal step. Sending too much water back to the electrolyzer input can flood the catalyst and electrode surfaces and greatly reduce reaction efficiency. A small amount of water or water vapor within the recycle stream 232 can be beneficial in the electrolyzer, as it prevents the catalyst from completely drying out.

The output stream 234, as output by splitter 230, is directed to a first separator stage 240, which further purifies a first product gas by removing residual reactants or unwanted by-products. A secondary recycle loop 242 recirculates unconverted materials from the separator back to the electrolyzer input stream, ensuring minimal waste. The secondary recycle loop 242 can be driven by another recycle blower but might also be driven by output pressure after the first separator stage 240. A purified first product gas exits the system via first product stream 246, ready for downstream applications, storage, or other valorization. In some embodiments, a recycle loop 242 may not exist, allowing unreacted oxocarbon gases or other gases to pass to the next separator stage.

In specific embodiments, the order of components may be switched. For instance, some systems may not need all product gases to be recycled back to the electrolyzer. In these cases, the first separator stage 240 could be placed first, while the splitter 230 could be placed on the retained portion of the gas stream 244 where a portion can be recycled that contains a second product gas an unreacted oxocarbon.

Remaining gas stream 244 continues to a second separator stage 250. Second separator stage 250 further purifies a second product gas by removing residual reactants or unwanted by-products, whereupon a second product gas can exit the system via a second product stream 256 for later use. Another secondary recycle stream 252 recirculates unreacted oxocarbons back to the electrolyzer input stream. Recycle stream 252 may also contain some product gases depending on the nature of the second separator stage 250. Secondary recycle loops are pictured as being unitary outputs of each separator stage, but in specific embodiments, separate recycle streams can be present as outputs of individual separator elements with a separator stage that includes more than one element.

System 200 can also include optional steps to remove impurities within the system (e.g., from output stream 254) in step 260. In some embodiments, nitrogen can build up within the system and be recycled along with reactant and product gases. Over time, nitrogen levels can interfere with system operation or decrease its efficiency. In specific embodiments, after the second separator stage, a portion of the recycle stream 252 can be purged or sent to a thermal oxidizer; this removes built-up nitrogen but also wastes product and reactant. In specific embodiments, this can include a third separator stage that extracts products and reactants, leaving a nitrogen-rich stream. This stream can be purged or oxidized as previously mentioned, or could be used elsewhere in the system as a separator purge gas.

In some embodiments, other impurities can be created within the system and can be removed. Portions in the system with higher levels of CO, particularly where iron or nickel are present, can be coated to lower the chances of creating metal carbonyl compounds. Nevertheless, it may be difficult to completely prevent any carbonyls from forming. In specific embodiments, a recycle stream can go through a section including a carbonyl decomposition catalyst that removes trace portions from the recycle stream. It is better to remove carbonyls that build up within the system quickly, even when present in trace amounts, as they can impact the life and performance of electrolyzer catalysts.

Figure 3:
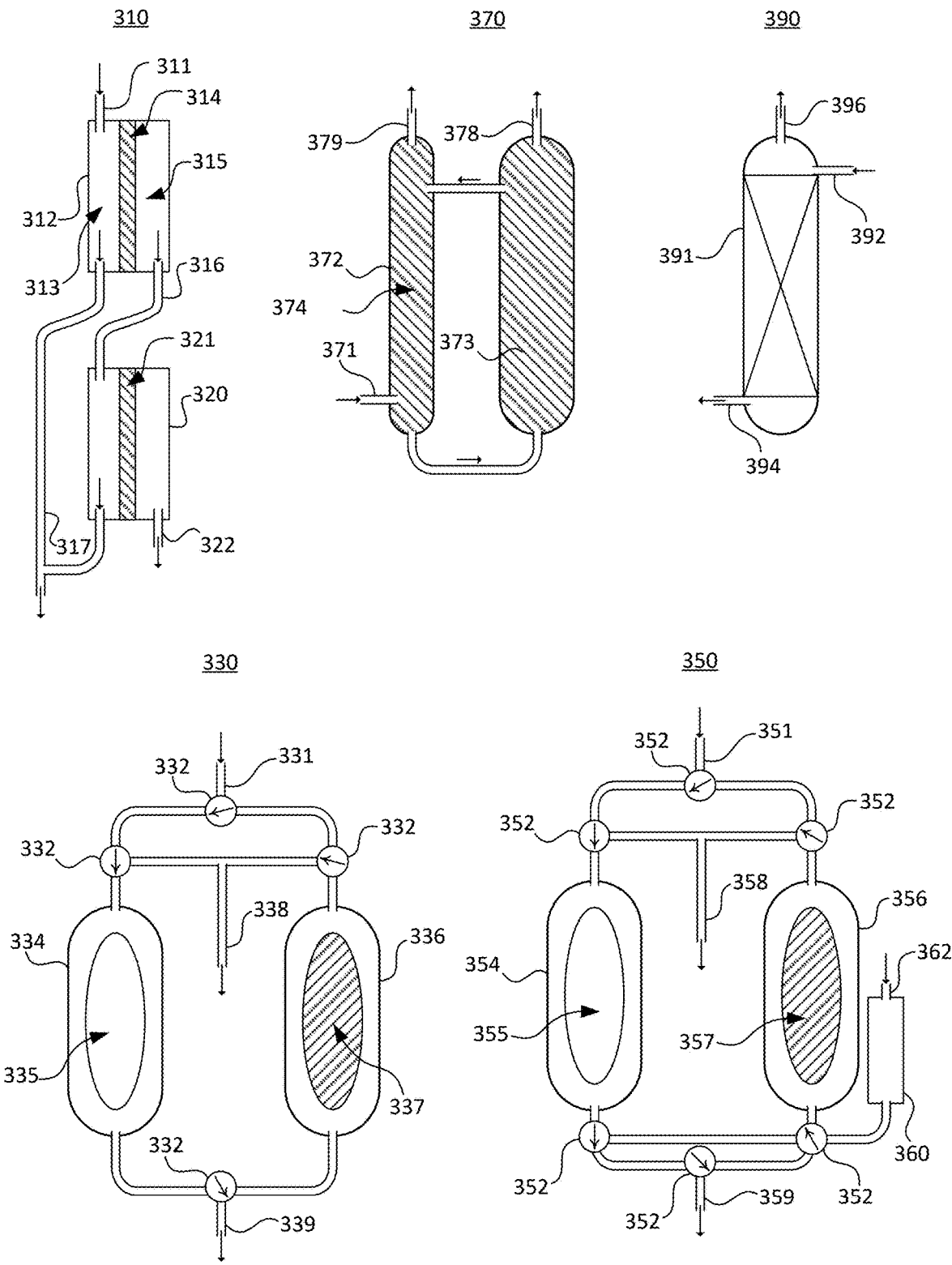
FIG. 3 illustrates several types of separators used in oxocarbon electrolyzer systems in accordance with specific embodiments of the inventions disclosed herein.

FIG. 3 shows a number of possible gas separators that can be used in a system such as systems 100 or 200. This list of separators is not intended to be exhaustive but instead shows some exemplary methods and structures for separation. This is also intended to illustrate how the separation techniques and configurations might affect the composition and flows of gases throughout the system, which may affect the control schemes as mentioned previously. For example, a separation method that works periodically may release product and recycle gases at different times and concentrations. By adjusting control parameters such as changing the ratios of various recycle streams, the mole percentages of reactant and product gases can be kept closer to desired target values at all times. Different types of separators have their own terminology that is typically used with them. For simplicity, this will be standardized for purposes of the present application. A gas stream that passes through the separator will be referred to as the permeate. A gas stream that is retained or otherwise absorbed will be referred to as the retentate. Many times, a product gas can be purified as the permeate of a separator and gases to be removed released as a retentate. In some configurations, the product to be purified may come from the retentate portion of the separator.

Structure 310 is an exemplary structure showing a membrane separator. This example shows a dual-stage membrane. Gas to be separated enters at input line 311. Membrane separator 312 comprises an entry chamber 313 and an exit chamber 315, separated by a selectively permeable membrane 314. The membrane can be selected so that one or more gases in the input mixture have a higher permeability than other gases. Some membrane separator stages may have a single membrane. In cases where a higher purity permeate is required, multiple membrane separators can be used in the same stage. In this example, the permeate 316 can be routed to the entry chamber of a second membrane separator 320. Membrane 321 in the second separator 320 can be the same material or different from membrane 314. In specific embodiments, membrane materials and form can be chosen to achieve partial separation to concentrate the retentate or permeate. In specific embodiments, membrane materials and forms can be chosen with lower permeability to retain some of the desired product in the retentate but only let through a very pure product in the permeate. For example, separator 312 may be configured to concentrate the product gas in permeate 316, but membrane 321 could be chosen to have a different material than membrane 314 so that the final permeate 322 is highly pure. Retentate portions from each separator can be combined in a retentate 317 that can be recycled to the electrolyzer or otherwise processed at later steps.

Structure 330 is an exemplary structure showing a pressure swing adsorber (PSA) separator. This example shows a dual-chamber design, but it could be implemented as a single chamber. A chamber 334 contains an adsorbate 335 with a high surface area. Incoming gas 331 at a higher pressure can be adsorbed onto the surface of the adsorbate 335 until it is saturated or nearly saturated. Permeate gas 339 will now be more highly concentrated in one or more of its gas constituents that do not adsorb well onto the adsorbate. Following this step, pressure can be lowered in the chamber 334 and the adsorbed gas portion can be released through into a retentate 338. In some cases, pressure can be lowered using a vacuum. Using a PSA in this manner would lead to a highly cyclical flow pattern where permeate and retentate would stop and start at the cycle time of the structure 330. In the separator as shown, a second chamber 336 with the same adsorbate 337 as the first adsorbate 335 is provided. Various valves 332 are added to control the gas flow through the separator. In the configuration as shown, an incoming gas enters at 331, a retentate gas is adsorbed at 335, and a permeate gas is passed through at 339, while previously adsorbed gas from adsorbate 337 is released as a retentate 338. Once the adsorbate 335 reaches saturation, valves can be changed to a second parallel configuration, where the adsorbed gas on adsorbate 335 is released as a retentate at 338, and new input gas flows into chamber 336 where retentate gas can adsorb on adsorbate 337 while permeate gas continues to flow out at 339. Though flows and concentrations may not hold exactly constant through this process, a dual-chamber PSA can run in a roughly continuous mode with a much more even flow rate from both outputs than a single chamber. In specific embodiments, three or more chambers could also be used in a PSA separator to further even out flows and concentrations.

Structure 350 is an exemplary structure showing a TSA separator. This example shows a dual-chamber design, but it could be implemented as a single chamber. TSA separators share many features with PSA separators. A chamber 354 contains an adsorbate 355 with a high surface area. Incoming gas 351 at a higher pressure can be adsorbed onto the surface of the adsorbate 355 until it is saturated or nearly saturated. Permeate gas 359 will now be more highly concentrated in one or more of its gas constituents that do not adsorb well onto the adsorbate. In the separator as shown, a second chamber 356 with the same adsorbate 357 as the first adsorbate 355 is provided. Various valves 352 are added to control the gas flow through the separator. In the configuration as shown, an incoming gas enters at 351, a retentate gas is adsorbed at 355, and a permeate gas is passed through at 359, while previously adsorbed gas from adsorbate 357 is released as a retentate 358. Unlike with a PSA separator, releasing pressure does not clear the retentate from the adsorbate, but instead heat is used. In some cases, a purge gas 362 is passed through a heating element 360 which is then passed through chamber 356. Once the adsorbate 335 reaches saturation (and the retentate is removed from adsorbate 357), valves can be changed to a second parallel configuration, where the adsorbed gas on adsorbate 355 is released as a retentate at 358 through heating, and new input gas flows into chamber 356 where retentate gas can adsorb on adsorbate 357 while permeate gas continues to flow out at 359. Purge gas 362 can be a separate inert gas that is separated later from the retentate, but in some cases can be a heated product gas from other parts in the system or can be a portion of the dried permeate gas 359. TSA can take more energy and take more time than PSA to achieve a single cycle (due to waiting for temperatures to rise and fall in the chambers), but it may be the best solution for separating out some substances. For example, water is very difficult to use in PSA separators as it adsorbs strongly to common adsorbates used in those systems and is not easily removed using pressure changes.

Structure 370 is an exemplary structure showing a simplified version of a lean oil absorber (LOA) separator. In this example, the separator has a gas absorption chamber 372 and a gas extraction chamber 373. A hydrocarbon oil 374 fills the chambers and is configured to flow in a counterclockwise direction between the chambers. As the oil flows downward in chamber 372, input gas to be separated flows in at input port 371 and rises through the chamber to exit as a permeate 379. The lean oil 374 has a high solubility for other hydrocarbons such as ethylene and can extract 60-90% of the hydrocarbon. The oil then flows to the gas extraction chamber 373 where a retentate gas that was absorbed is removed and passes as a retentate gas 378. LOA is commonly used to purify hydrocarbon streams to very high purity. In this case, the purified product gas exits as a retentate rather than the permeate. Even if some of the product gas still remains in the permeate, that portion can be recycled through the electrolyzer as previously mentioned and extracted later as a product. Extraction from the oil can take place in a number of ways, including heat or steam stripping, flash distillation, or fractional distillation if multiple hydrocarbons are separated.

Structure 390 is an exemplary structure showing a simplified version of a cryogenic separator. Column 391 has a cooling structure surrounding the column. Gas to be separated is fed into the input 392. Optionally, the gas can be precooled before entering the column. Condensed cooled liquid can be extracted from bottom output port 394, while gas that has not liquified exits at the top output port 396. This is a one column design where there are two outputs (a gas and a liquid). More complicated options are available, such as a fractional distillation column, which can have three or more outputs. In some versions, multiple separation stages can be present in the separator to separate out three or more gases, including elements such as expansion knockout drums, Joule-Thomson valves, and others.

In specific embodiments, a cryogenic separator will function more efficiently when the mol % of oxocarbon is kept lower through the recirculation of product gas as disclosed herein. A cryogenic separator can be used to selectively liquefy a desired product gas for purification (e.g., ethylene) from unreacted oxocarbon (e.g., carbon monoxide) and any other product gases (e.g., hydrogen). Having a lower mol % of oxocarbon in the output of the electrolyzer can increase the dew point and thereby make cryogenic distillation easier. For example, in the case of carbon monoxide as the oxocarbon, ethylene as the product gas, and hydrogen as another product gas, for 40 mol % hydrogen, 45 mol % carbon monoxide, and 15 mol % ethylene, the gas dew point is −131.3° C. and for 40 mol % hydrogen, 15 mol % carbon monoxide, and 40 mol % ethylene the gas dew point is −117.9° C. Accordingly, as can be seen from this example, an increased oxocarbon mol % in the output stream from the electrolyzer can result in more efficient cryogenic separation.

Multiple of the same or different types of separators can be used within a single separator stage. For instance, a membrane separator can be used to concentrate ethylene from a gas mixture, which is then passed onto an LOA separator to refine and fully purify it. In this manner, no single separation element must be tuned to completely separate different portions, and separation can occur with lower energy or cost while still providing highly pure final products.

Figure 4:
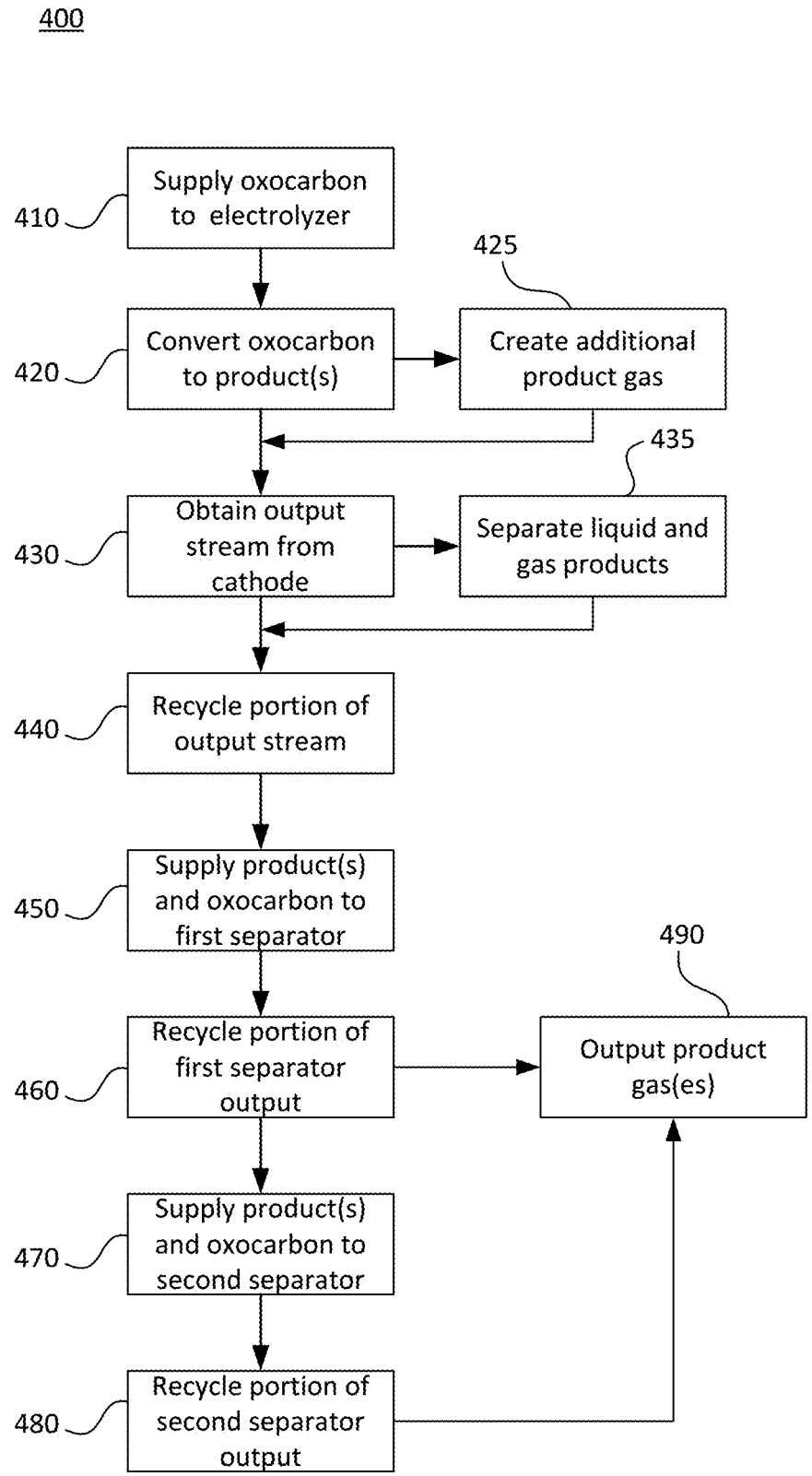
FIG. 4 shows a process for operating an oxocarbon electrolyzer and separating product gases in accordance with specific embodiments of the inventions disclosed herein.

FIG. 4 shows a process 400 for converting and separating products in an oxocarbon electrolyzer according to specific embodiments. In step 410, an oxocarbon is supplied to the input stream of an electrolyzer. The oxocarbon species is commonly supplied to a gas diffusion electrode in a cathode chamber. In step 420, during electrolysis, the oxocarbon is converted to one or more conversion products. The conversion products can include a primary gas conversion product, e.g. ethylene, but may also include liquid products. At the same time, in optional step 425, one or more additional gas products can be produced at the cathode, e.g. hydrogen gas. In specific embodiments, steps 420 and 425 can be combined, where reduction of the oxocarbon species under certain conditions leads to production of two product gases. An output stream is obtained from the cathode in step 430. Optionally, in step 435, liquid and gas portions can be separated from the output stream using a gas/liquid separator. The gas portion can contain one or more products as well as unreacted oxocarbon.

In step 440, a portion of the output stream, which can comprise just gas at this point, is recycled back to the input stream of the electrolyzer. Another portion of the output stream is supplied in step 450 to a first separator stage. This portion can contain one or more products as well as unreacted oxocarbon. In specific embodiments, the order of steps 440 and 450 can be switched.

In step 460, a portion of the first separator output can be recycled to the input stream of the electrolyzer. This step may be omitted in some circumstances if there are additional product gases. Purified product gas can be output from the first separator in step 490.

In some embodiments, one or more additional product gases may be present in the gaseous output stream of the electrolyzer. In this case, the process continues to step 470, where remaining products and unreacted oxocarbon are supplied to a second separator stage. Following the separation, in step 480 a portion of the product gases from the output stream can be recycled to the input stream of the electrolyzer, and purified additional product gas can be output in step 490. If more than one additional product gas were in the output stream, other separation steps could be repeated as described.

Various examples of electrolyzer and separator systems are now presented according to different embodiments.

Example 1—Electrolyzer with Membrane Separators

Membrane-based processes for gas separation present the advantage of being easy to operate and being passive processes not using any external consumables (solvent, sorbent, or others). The main drawback of this technology is the need for pressure, which is the separation driving force. As a result, the compression costs to drive separation can be significant.

In this example, the system employs a CO electrolyzer that produces ethylene and hydrogen as primary product gas and additional product gas respectively. Due to the gaseous properties of hydrogen, ethylene and carbon monoxide, membrane-based processes are expected to be an efficient means of separation for this mixture. Specific properties which can influence the gas permeation through a membrane material are mainly the molecule kinetic diameter, the boiling point, the molecular weight, the dipole moment and, more generally, the affinity of the molecule with the membrane material. These properties are displayed in Table 1.

TABLE 1

The physical properties of the prevalent gases in a CO electrolyzer cathode stream

| Component | M (g/mol) | Diameter (pm) | Boiling point (° C.) | Dipole moment (D) |
|---|---|---|---|---|
| $C_2H_4$ | 28.05 | 376 | −103.7 | 0.0 |
| CO | 28.01 | 416 | −191.5 | 0.11 |
| $H_2$ | 2.02 | 289 | −252.9 | 0.0 |

The differences in each compound can be exploited in a membrane-based separation unit.

In some embodiments of the process, glassy polymers, such as polysulfone (PSF), cellulose acetate (CA) or polyimide (PI) provide selectivity for hydrogen over both CO and ethylene; selectivity is defined here as the ratio of permeance for each compound through a given membrane material. As an example, hydrogen/CO and hydrogen/ethylene selectivities through PI are estimated at 110 and at 77, respectively. Therefore, glassy polymers are able to produce a concentrated stream of hydrogen (95-100% v) from a gas mix containing hydrogen, ethylene and CO.

In some embodiments of the process, rubbery polymers such as Polyactive (a multiblock copolymer of Poly(ethylene glycol) (PEG) and poly(butylene terephthalate) (PBT)), or silicon rubber (such as Polydimethylsiloxane (PDMS) or Polyoctylmethylsiloxane (POMS)) can be suitable for CO/ethylene separation. The permeation through these membrane materials is typically solution controlled and will depend on the solubility and diffusion of the component. This kind of material usually presents a CO/ethylene selectivity between 5 and 20, which is the minimum viable value for a commercial process.

Figure 5:
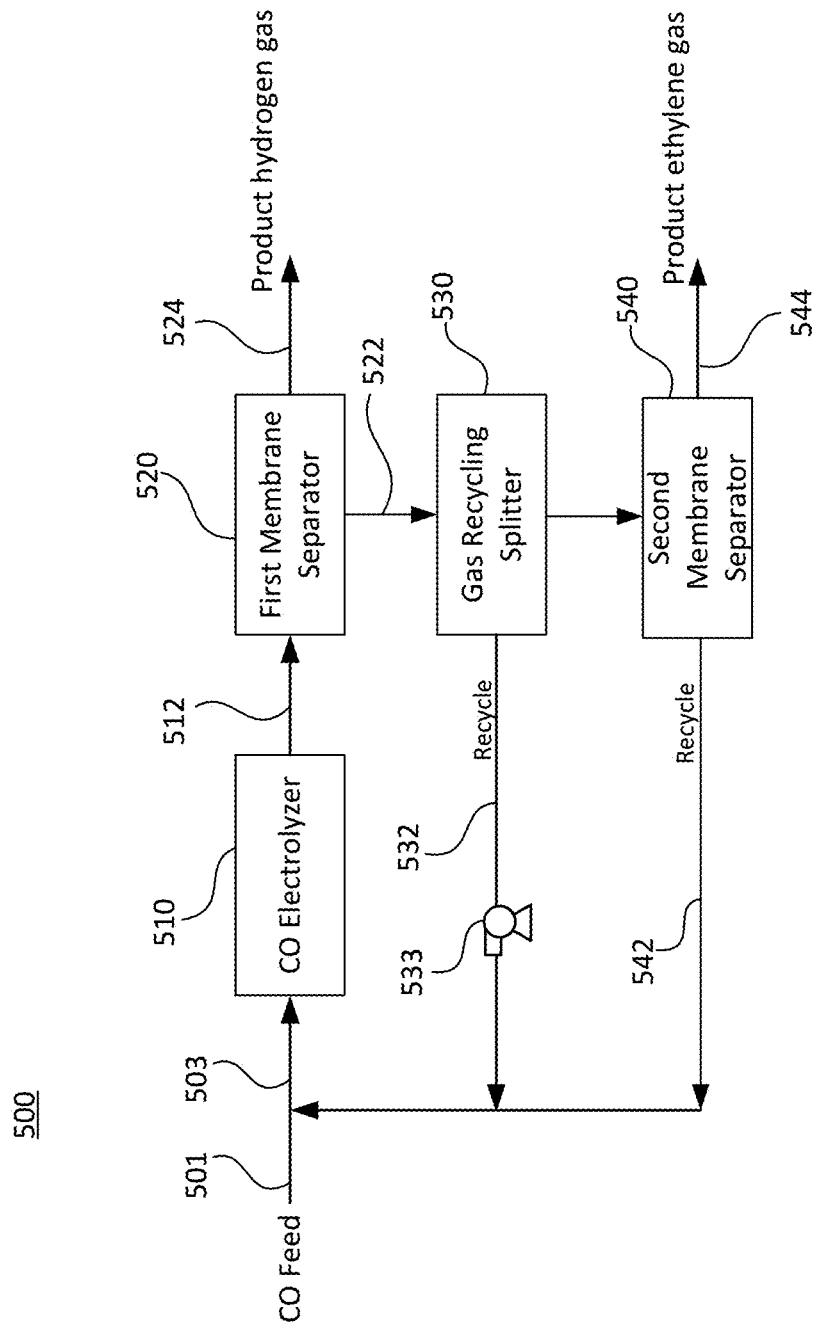
FIG. 5 provides a diagram of an oxocarbon electrolyzer system with multiple product gases in the form of hydrogen and ethylene in accordance with specific embodiments of the inventions disclosed herein.

FIG. 5 shows a diagram of a CO electrolyzer system 500 with two membrane separator stages in accordance with specific embodiments. A CO-rich input gas 501 is put into the input stream 503 of an oxocarbon electrolyzer 510. The output stream 512 is first directed to the first membrane separator stage 520, which may have one or more membrane separator elements. The system can also include an optional gas/liquid separator (not pictured) before the first membrane separator that directs the gaseous portion of the output stream 512 toward the first membrane separator stage. The first membrane separator outputs purified hydrogen gas 524. Retentate stream 522 can be sent to a gas recycling splitter 530, where a portion 532 is recycled (optionally with a blower 533) to the input stream 503. Portion 532 largely comprises ethylene and CO at this stage. The other portion is sent to a second membrane separator stage 540, which may also have one or more membrane separator elements. The second membrane separator stage 540 outputs purified ethylene gas 544. CO and any unseparated ethylene in the retentate 542 can also be recycled to the input stream 503.

In some embodiments of the process, the CO electrolyzer is operated at pressures lower than that required for separation and as such a compression step is required before the first membrane separator stage 520. The required pressure for separation is expected to be below 30 barA and, ideally, below 10 barA. In some embodiments of the process, the compression unit will be a multistage process.

In some embodiments of the process, a single or multistage glassy polymer membrane-based unit allows hydrogen to be separated from the CO and ethylene. The glassy polymer membrane material can be PSF, CA or PI. Hydrogen is recovered in the permeate stream while CO and ethylene are recovered in the retentate. Hydrogen purity is expected to be higher than 97% v and, ideally, higher than 99% v. The expected number of membrane stages is expected to be between 1 and 2 also according to the hydrogen purity targeted. According to the valorization pathway of hydrogen, a polishing unit can be required to achieve the desired specifications.

Downstream of the glassy membrane(s), a single or multistage rubbery membrane-based unit allows the separation of ethylene from CO coming from the glassy polymer membrane unit. The rubbery polymer membrane material can be Pebax, Polyactive, PDMS or POMS. Ethylene is recovered in the permeate stream with the remaining traces of hydrogen, while CO is recovered in the retentate. The process configuration is optimized to maximize the ethylene purity while having a recovery rate of ethylene in the retentate between 40% and 85%. The expected number of membrane stages is expected to be between 1 and 4. According to the valorization pathway of ethylene, a polishing unit can be required to achieve the desired specifications. The pressurized CO-concentrated retentate stream is recirculated upstream of the electrolyzer.

In some embodiments of the process, a small purge can be set on the CO recirculation from the rubbery polymer membrane-based unit to avoid any impurity accumulation, especially methane ($CH_4$) and nitrogen ($N_2$) which would have been present in the CO feed. Additional separation stages to remove impurities as previously mentioned could also be included here.

According to the inlet pressure, the exact gas mix composition and the technical targets (product purities and recovery rates), both the membrane-based unit blocks can require more than one separation stage. The final process scheme can comprise several membrane modules, internal reticulations, compressors and vacuum pumps.

Depending on the CO conversion rate through the electrolyzer, the ethylene content in the CO/ethylene mix downstream of the hydrogen separation step can be quite low (<10-40% v). This low ethylene content, coupled with the relatively low selectivity of the rubbery membrane materials, can lead to a high number of membrane stages in the silicon rubber membrane-based unit to achieve the targeted ethylene purity. This results in a high process complexity, high capital expenditure (CapEx) and high specific energy.

The CO/ethylene retentate stream coming from glassy polymer membrane-based unit is pressurized at the pressure of the final membrane separation stage. This means no compression unit is required upstream of the silicon rubber membrane-based unit or to recirculate a part of the stream upstream of the CO electrolyzer.

The partial recirculation of CO/ethylene from downstream of the hydrogen separation to upstream of the electrolyzer allows the ethylene content to be increased at the electrolyzer outlet and, as a result, at the outlet of the glassy polymer membrane-based unit. This allows the number of required membrane stages to be minimized, especially for the rubber membrane-based unit that separates ethylene from CO. As a result, in one advantageous outcome of this process, both the CapEx and the operating expenditures (OpEx) linked with the process block will be decreased.

During operation, the CO/ethylene recirculation rate controls the ethylene content at the inlet of the rubber membrane-based unit. This means that the ethylene purification scheme can easily adapt to a change of CO conversion rate at the electrolyzer. If the catalyst activity decreases with time in the CO electrolyzer resulting in a lower one pass CO conversion rate, the recirculation rate will be increased to accumulate more ethylene in order to keep a constant gas composition at the inlet of the rubber membrane-based unit. With such a feature, the downstream ethylene purification unit can adapt to any change of catalyst activity in the electrolyzer unit.

As an example, it has been calculated that, to obtain a gas mix comprising around 40% v of ethylene and 60% v of CO at the outlet of the glassy polymer membrane-based unit, it was necessary to set a recirculation rate at 35% or 68% for a CO single pass conversion of 50% or 33%, respectively.

The higher the recirculation rate, the more energy consumed by the compression unit. At recirculation rates higher than 75%, this energy consumption exponentially increases, which becomes unproductive for the overall process energy efficiency.

The more the recirculation rate increases, the more the ethylene content at the CO electrolyzer inlet increases. Even if ethylene is an inert gas regarding the CO electrolyzer, its presence can impact the electrolyzer catalyst activity because of the decrease of CO partial pressure. However, this effect can be considered negligible if ethylene content remains below 70%.

In some embodiments of the invention, the additional partial pressure of ethylene is able to support the catalytic stability of the CO electrolyzer. During CO electrolysis to ethylene, the overall pressure of gas drops, due to two molecules of CO being converted to one molecule of ethylene. This pressure decrease can hinder the mass transport of gas to/from the active catalyst and cause catalytic efficiency to drop for a given rate of ethylene formation, particularly at high single pass conversion. One strategy to improve this is to increase the stoichiometry of CO fed to the CO electrolyzer, i.e. to flow more CO than the electrolyzer can convert to encourage sufficient movement of gases in the electrolyzer (low single pass conversions). In this case, although activity is maintained, the ethylene % v at the outlet is reduced. To circumvent this issue, specific embodiments disclosed herein recirculate both CO and ethylene into the CO electrolyzer inlet, allowing the ethylene to maintain a sufficient gas pressure to support stable catalytic transformation of CO, while the % v of ethylene levels at the outlet remain sufficient for cost-effective, membrane-based separation.

Example 2—Electrolyzer with TSA, PSA and Lean Oil Separators

When higher purity streams of ethylene and other product gases are required, membrane separators alone may not be sufficient. In a CO electrolyzer system as described herein, product gases are typically produced at relatively low pressure, thus it would be desirable to have ethylene and other product gases able to be separated at lower pressure as well. Various options are available to separate out gases in these systems, but they may not work well with the mix of product gases. In particular, distillation methods or cryogenic separation would not work as well in product gases with significant levels of CO and low levels of methane or other C1 gases without high energy costs. However, combinations of separation methods can be effective, where some separation techniques concentrate a product gas, and then others can refine them to high purity. This works well in tandem with the ability to recycle product gases along with unreacted oxocarbon, since separators that concentrate certain product gases often leave significant portions of the original gas mixtures in both retentate and permeate portions.

It is also useful for a system to accommodate changing feed gas composition. The optimal electrolyzer feed gas composition depends on many operating variables and on the commercial objectives (e.g., product slate, electrolyzer operating costs, electrolyzer component life, and the like). The CO-rich feed gas can come from various sources that produce different CO-rich feed gas compositions. It would be desirable to be able to adjust the composition of the electrolyzer feed gas by recycling multiple streams from different locations in the gas processing system.

Figure 6:
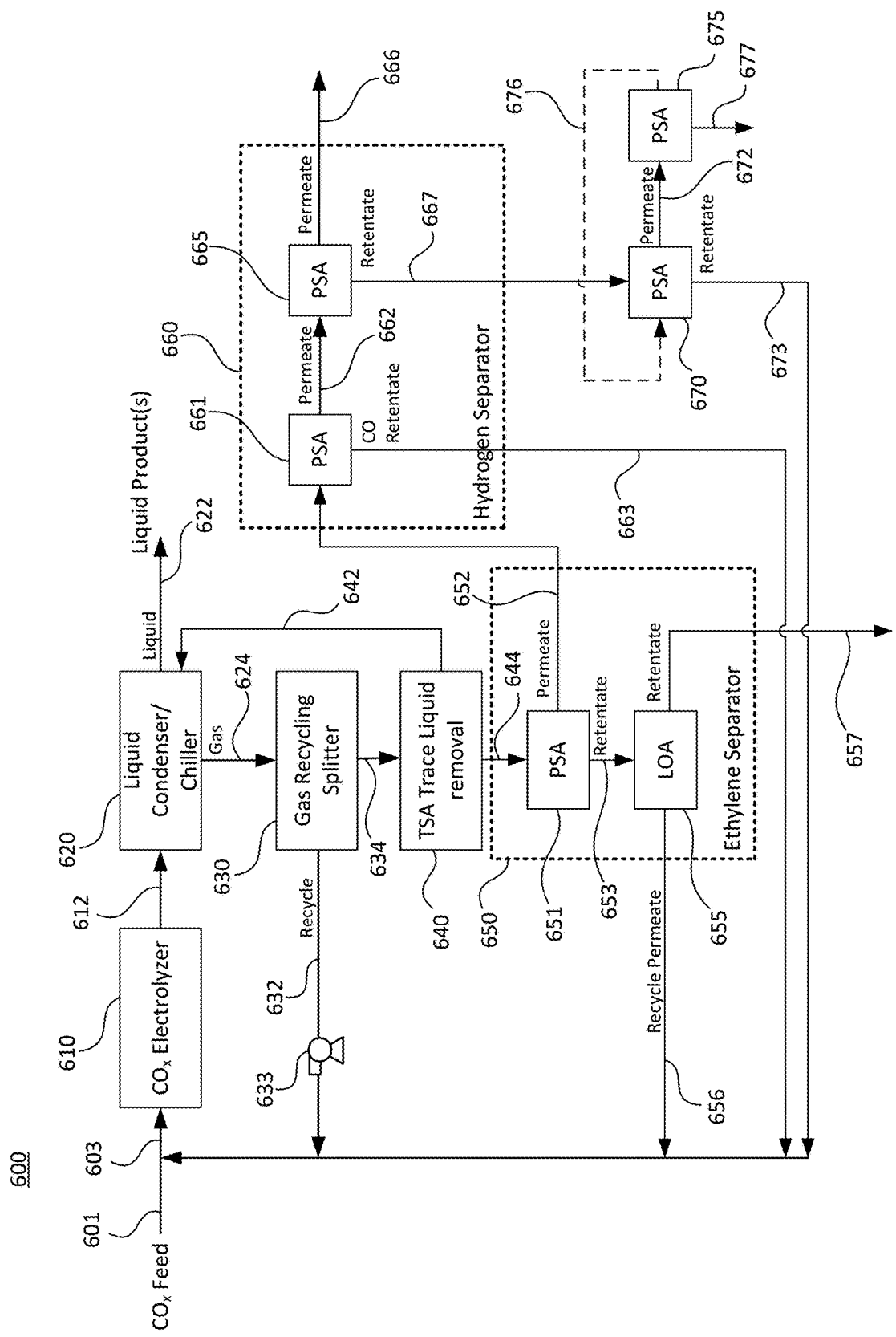
FIG. 6 provides a diagram of an oxocarbon electrolyzer system with a pressure swing adsorber (PSA) separator in accordance with specific embodiments of the inventions disclosed herein.

FIG. 6 shows a diagram of a CO electrolyzer system 600 with two gas separators in accordance with specific embodiments. A CO-rich input gas 601 is routed into the input stream 603 of an oxocarbon electrolyzer 610. The output stream 612 is first directed to a gas/liquid separator to remove alcohols, carboxylates, and water that may be present in the output stream. In this example, the gas liquid separator is a liquid condenser scrubber 620. Liquid product stream 622 can be removed and processed separately. A portion of the mostly dried gaseous output stream 624 can be recycled directly with a gas recycling splitter 630. The recycle stream 632, which may be moved with a blower 633, is routed to the input stream 603 of the electrolyzer. Remaining gas 634 can still have trace amounts of water and alcohols such as ethanol or propanol; these can be removed in a TSA separator 640. Retentate is sent back to the liquid condenser scrubber 620, while the permeate dried gas mixture 644 is sent to separation stages. Periodically, a portion of the dried gas mixture 644 can be heated using electrolyzer waste heat or other heating methods to regenerate the TSA adsorbent. The cooled humid TSA purge gas can be pressurized in a blower and recycled to the chilled water scrubber as mentioned.

Dried gas mixture 644 is routed to a first separator 650, which in this case separates out ethylene and can comprise more than one separator stage. The majority of ethylene is removed from the stream by a PSA 651 into the retentate stream 653. The PSA can use silica gel, zeolites, a copper-impregnated sorbent combined with activated carbon, or metal organic framework (MOF)-based adsorbents to recover most of the pressurized (about 10 barA) gas. At the end of the ethylene adsorption cycle when ethylene breakthrough begins, the PSA feed is switched to an initial hydrogen purge stream to purge the residual CO-containing feed gas (TSA dried product gas mixture 644) from the void spaces in the PSA 651. After the CO is purged from the void spaces (i.e., hydrogen breakthrough) a small limited volume final methane purge is performed using a portion of the methane purge stream from the LOA 655. This replaces the majority of the purge hydrogen in in the PSA void spaces without methane breakthrough and loss to the PSA permeate stream. The double purge minimizes the amount of CO in the void spaces prior to depressurization. The hydrogen purge is allowed to breakthrough into the permeate CO and hydrogen stream in order to minimize the CO content in the void spaces, which is the most difficult impurity specification to meet in the polymer grade ethylene. Methane replaces most of the purge hydrogen. Although more difficult to remove from the ethylene than the hydrogen, the much higher allowable methane impurity in the polymer grade ethylene provides a significant ethylene purification advantage versus hydrogen in the production of polymer grade ethylene. Hydrogen and methane for these purges can be obtained from other parts of the system, though methane can be supplied separately. In specific embodiments, instead of methane, the final purge can be done with an additional portion of hydrogen to ensure little to no CO remains.

The ethylene-rich retentate stream 653 is emitted from the PSA when it is depressurized as part of its cycle and is passed to an LOA 655. The retentate can be pressurized before sending into the LOA 655. Retentate of the LOA 655 can be output as a purified ethylene stream 657. Tail gas leaving through the LOA permeate 656 can be recycled as depicted to the input stream 603 of the electrolyzer. In some embodiments, the permeate 656 can instead be sent to be mixed into the output stream 624 of the liquid condenser, whereupon a portion can be recycled and the rest sent back through the ethylene separator stage.

The ethylene-lean permeate gas 652 moves along into the second separator 660, which separates out hydrogen from the gas mixture remaining. Separator 660 can also comprise more than one separator stage. Permeate gas 652 from the PSA 651 is heated using electrolyzer byproduct heat to the optimal PSA absorption temperature of 30° C., though this temperature can be adjusted optimally for the adsorbent chosen. The heated gas is routed to the first hydrogen PSA 661. The first hydrogen PSA 661 is designed for maximum hydrogen and nitrogen recovery. It is an important design feature of the first hydrogen PSA 661 to maximize the permeate flow of nitrogen while simultaneously maintaining a minimal permeation of CO. CO has a somewhat higher adsorption force than nitrogen and eliminating the final nitrogen adsorption bed maximizes the differential adsorption between nitrogen and CO.

The first hydrogen PSA 661 is periodically depressurized and the low pressure CO-enriched and nitrogen- and hydrogen-depleted tail gas retentate 663 is compressed and recycled back to the electrolyzer as one of the feed streams used to adjust the electrolyzer feed gas composition. Hydrogen purity and recovery can be adjusted if desired to adjust the composition and flow of the tail gas and electrolyzer feed composition.

The permeate 662 lower purity (typically 95%) hydrogen stream from the first hydrogen PSA 661 is routed to the second hydrogen PSA 665. The second hydrogen PSA 665 uses a high purity hydrogen design to produce high purity hydrogen (>99%), separating essentially all of the nitrogen into the second hydrogen PSA tail gas stream retentate.

The second hydrogen permeate high purity hydrogen stream 666 is exported, optionally to a compressor and third hydrogen PSA (not shown) which produces ultrahigh purity (>99.99% with less than 10 ppm CO), high pressure (>30 barg) hydrogen suitable for commodity pipeline distribution for fuel cells or use in petrochemical applications (CO-sensitive applications).

The tail gas retentate from the second hydrogen PSA 665 is compressed and routed to a nitrogen purge system. The nitrogen purge system is optional but can be useful if nitrogen levels build up quickly during use; this may be particularly true if the input feed gas 601 has a significant nitrogen content. This tail gas stream 667 is highly concentrated in nitrogen (typically 20-30 mol %) due to the unique design of the first hydrogen PSA and the use of two hydrogen PSAs in series which allows simultaneous recovery of most of the hydrogen and CO. Alternatively, the retentate tail gas stream 667 from the second hydrogen PSA can be sent directly to a thermal oxidizer. This option has a lower capital and operating cost, but has a lower recovery of hydrogen and CO.

By first removing the bulk of the CO and a small fraction of the nitrogen in a two-stage PSA, the nitrogen content is increased in the second stage PSA tail gas (nitrogen purge stream) and the CO content in the second stage PSA is significantly reduced. This allows a higher recovery in the second stage PSA since the low allowable CO content (typically less than 10 ppm to avoid fuel cell and refinery catalyst poisoning) is much lower than the allowable inert nitrogen content (typically 0.5%).

The nitrogen enriched compressed tail gas stream 667 from the second hydrogen PSA is routed to a CO adsorber PSA 670. The CO adsorber PSA 670 can use a copper impregnated zeolite adsorbant which selectively adsorbs CO and ethylene in the presence of nitrogen and hydrogen. The feed gas is essentially free of water and $CO_2$, maximizing the adsorption of CO and ethylene without competition for adsorption sites with water vapor and $CO_2$. A significant (>75%) recovery of CO and ethylene from the feed stream can be achieved with the copper impregnated zeolite adsorbant.

The CO-lean permeate gas 672 from the CO adsorber PSA is routed to a third hydrogen PSA 675 which is configured as a standard high purity hydrogen PSA with maximum nitrogen rejection into the tail gas stream 677. The nitrogen rich tail gas from the third hydrogen PSA typically contains >55 mol % N2 and is routed to thermal oxidizer, which can use wet low pressure byproduct oxygen from the electrolyzer to convert the nitrogen rich purge gas to nitrogen, water vapor and $CO_2$. The thermal oxidizer off-gas, after cooling and water condensate recovery, can be routed to a $CO_2$ absorption system (typically an amine-based absorber and stripper system) to recover and recycle the $CO_2$ in the thermal oxidizer off-gas back to the upstream CO generation section of the plant.

The high purity product hydrogen from the third hydrogen PSA permeate 676 is used as a sweep gas to periodically regenerate the CO adsorbent in PSA 670, eliminating or significantly reducing the tail gas compression required to recycle the tail gas back to the electrolyzer feed. The high purity hydrogen sweep gas lowers the partial pressure of CO during the regeneration step allowing CO desorption and high recovery without the need for a vacuum PSA to reduce the CO partial pressure. This results in a lower concentration CO product gas and a much higher concentration of hydrogen in the tail gas than the typical CO-rich tail gas produced by a CO PSA in high-CO content blast furnace gas applications. Although the CO purity is low, the CO recovery from the nitrogen rich purge gas is high (typically >80%) due to the high hydrogen purity and low CO content (>99% H2 and <1% CO) of the hydrogen sweep gas used during regeneration of the third hydrogen PSA 675.

The recycle hydrogen swept CO absorber tail gas stream 673 is a second recycle stream that can be adjusted by changing the second hydrogen PSA tail gas flow. In addition, a fraction of the product hydrogen to export or CO generation can also be routed to the CO absorber as supplemental sweep hydrogen to increase CO recovery and further adjust the electrolyzer feed composition and flow.

Example 3—Electrolyzer with TSA, PSA, Membrane, and Lean Oil Separators

Figure 7:
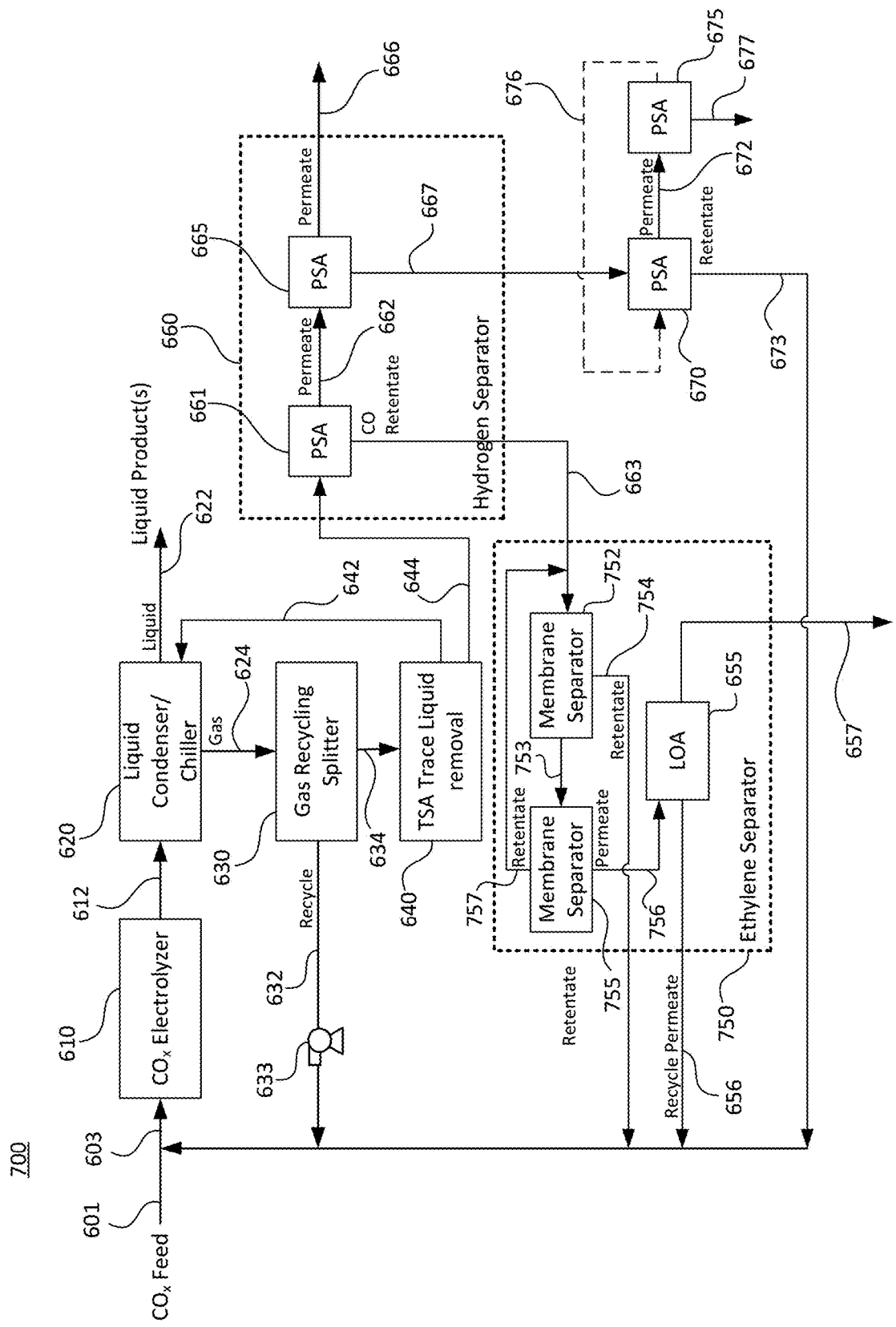
FIG. 7 provides a diagram of an oxocarbon electrolyzer system with a membrane separator in accordance with specific embodiments of the inventions disclosed herein.

Example 3 describes an electrolyzer system that is a variant of the system described in Example 2. The main change is that ethylene is not concentrated by a PSA but instead is concentrated using membrane separators. FIG. 7 shows a diagram of a CO electrolyzer system 700 with two gas separators in accordance with specific embodiments. In most respects, system 700 has identical portions to system 600 of FIG. 6. These portions can be referenced in Example 2 and numbering has remained consistent. System 700 differs from system 600 in one type of separator stage but also varies the process flow to accommodate this change. Dried permeate gas mixture 644 is not directly routed to the ethylene separator 750 in this embodiment, but rather to the hydrogen separator 660, where the permeate gas mixture 644 enters the first hydrogen PSA 661. Ethylene-lean permeate 662 is treated as specified earlier. The ethylene- and CO-rich retentate 663 is compressed to 20-30 barA and then routed to the ethylene separator 750 into a membrane separator 752. In this example, two membrane separators are used, but in some variants, one, three or more could be present to concentrate the ethylene to a selected purity. The permeate 753 is passed to a second membrane separator 755, while the retentate stream 754 can be recycled to the electrolyzer input stream 603. The second membrane permeate 756 may contain as much as 95 mol % ethylene at this point and is suitable for passing to the LOA 655 as previously described. The retentate 757 can be recycled back to the input of the first membrane separator 752, but in specific embodiments, the retentate 757 can be recycled along with retentate stream 754.

The high concentration of ethylene and low concentration of hydrogen (most of the hydrogen is removed in the first hydrogen PSA 661) in the feed gas allow the membrane(s) to produce both a high purity (>90 mol %) and high recovery (>60%) of ethylene in a permeate stream, due to the high ethylene partial pressure driving force in the membrane feed gas. In addition, the membrane can typically separate out over 90% of the CO which is a difficult to remove contaminant that must be removed to very low levels in the downstream LOA 655.

In specific embodiments, the high pressure membrane retentate stream can routed to an optional heater using byproduct electrolyzer heat and an expander to recover some of the power required in the membrane feed compressor. The depressurized retentate stream enriched in CO is recycled back to the electrolyzer. The low pressure permeate stream is compressed to 6 barA and routed to the LOA 655.

By splitting a hydrogen PSA into two adsorption separators in series (the first hydrogen PSA 661 and the second hydrogen PSA 665), the product ethylene and unreacted CO is concentrated in the tail gas of the first PSA, the nitrogen is concentrated in the tail gas of the second PSA and the permeate hydrogen from the second PSA has a higher purity since most of the impurities are removed in the first PSA. Together with the membrane, this system produces a low ethylene, low hydrogen, high CO content stream optimal for recycling to the electrolyzer. The membrane also produces a low CO, low hydrogen, high ethylene content feed stream to the lean oil absorption system which minimizes distillation equipment cost, refrigeration cost and power consumption. This system also produces a high nitrogen stream suitable to directly purge nitrogen through a thermal oxidizer or suitable for further nitrogen concentration and then purging through a thermal oxidizer with minimal loss of ethylene, hydrogen or CO.

Example 4—Electrolyzer with TSA, PSA, Membrane, and Cryogenic Separators

Figure 8:
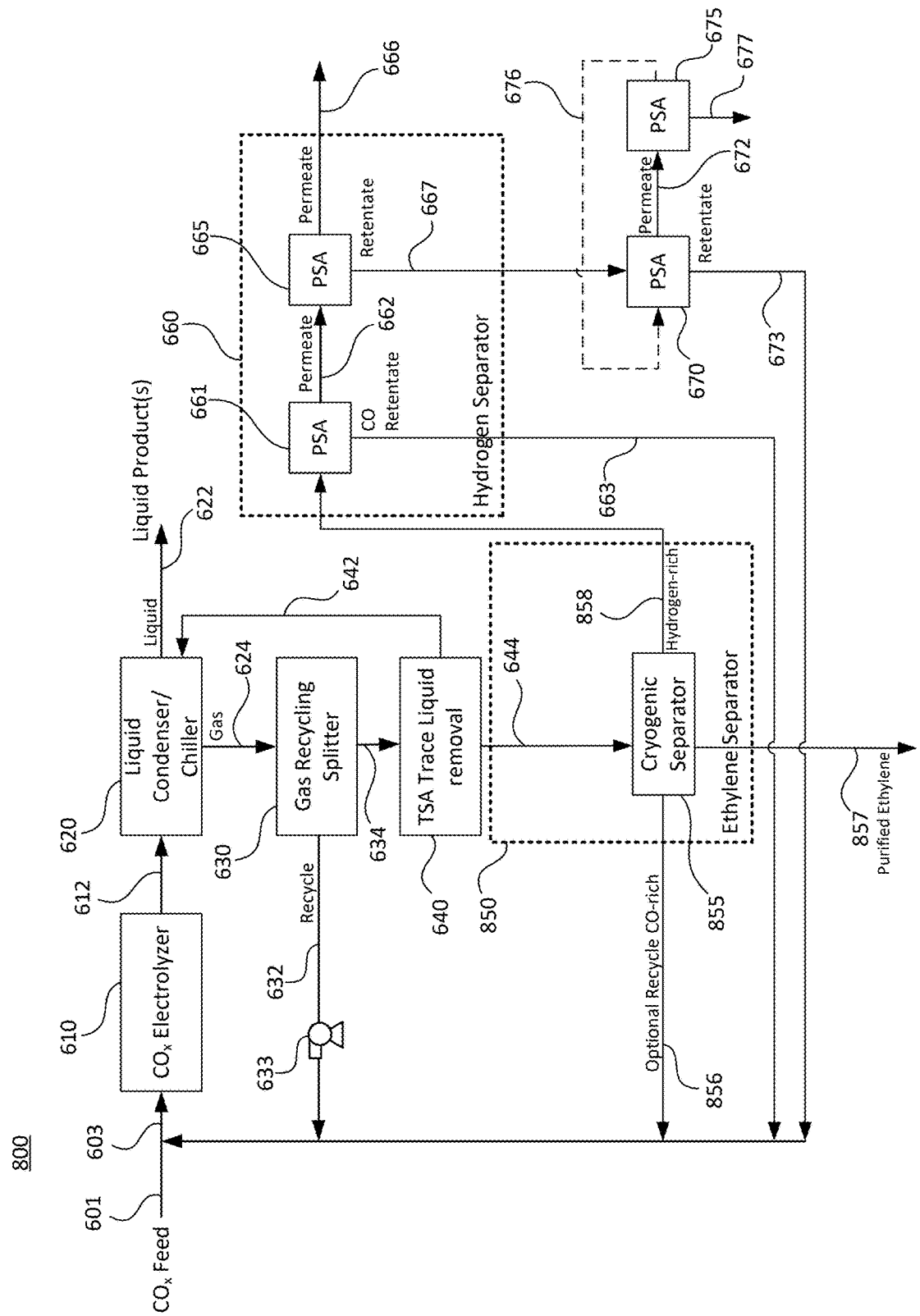
FIG. 8 provides a diagram of an oxocarbon electrolyzer system with a cryogenic separator in accordance with specific embodiments of the inventions disclosed herein.

Higher purity streams of ethylene and other product gases can still be produced with fewer components in separation than shown previously. Example 4 is an electrolyzer system with two separation stages that is similar to Example 2, but in this case, it does not have an ethylene concentration unit prior to the separator, which is a cryogenic separator. FIG. 8 shows a diagram of a CO electrolyzer system 800 with two gas separator stages in accordance with specific embodiments. System 800 has some identical portions to system 600 of FIG. 6, and other portions that are similar. Identical portions can be referenced in Example 2 and numbering has remained consistent.

In this example, the dried permeate gas mixture 644 is routed directly to an ethylene separator stage 850, which comprises a cryogenic separator 855. Purified ethylene can be recovered at the cryogenic separator ethylene output 857. Hydrogen-rich gas in output stream 858 is routed to the first hydrogen PSA 661 in the hydrogen separator and is treated similarly to the same downstream elements as in Example 2. Output stream 858 can have a significant amount of CO as well, especially in embodiments where the cryogenic separator 855 has two outputs for gas and liquid. In some embodiments, the cryogenic separator can be configured to also output a CO-rich gas stream 856. In this case, the CO-rich stream can be directly sent into the recycle stream toward the electrolyzer input, and the other hydrogen rich output stream 858 can be processed as described above.

Example 5—Electrolyzer with TSA, PSA, and Lean Oil Separators

Figure 9:
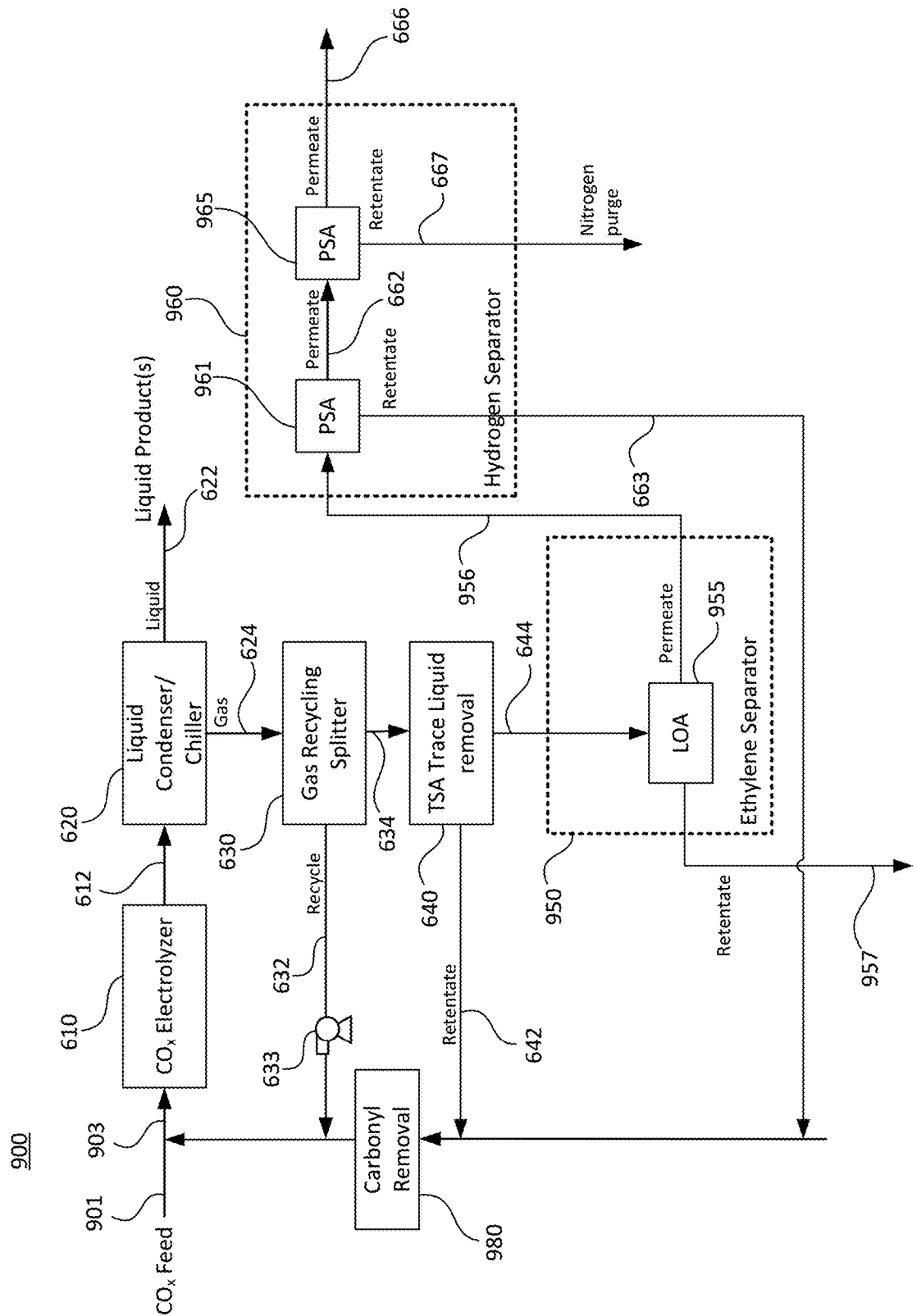
FIG. 9 provides a diagram of an oxocarbon electrolyzer system with a lean oil absorber (LOA) separator in accordance with specific embodiments of the inventions disclosed herein.

Example 5 is an electrolyzer system with two separation stages that is similar to Example 2, but in this case, it does not have an ethylene concentration unit prior to the lean ethylene absorber. FIG. 9 shows a diagram of a CO electrolyzer system 900 with two gas separator stages in accordance with specific embodiments. System 900 has some identical portions to system 600 of FIG. 6, and other portions that are similar. Identical portions can be referenced in Example 2 and numbering has remained consistent. Input feed 901 can be relatively pure CO, or a CO-rich syngas.

In this example, after trace liquids are removed at the TSA separator 640, the retentate 642 can be routed to the electrolyzer input stream 903 rather than back to the condenser scrubber 620. The dried permeate gas mixture 644 is routed directly to an ethylene separator stage 950, which comprises an LOA 955. The LOA 955 recovers 75-80% of the ethylene as polymer-grade ethylene from the pressurized (11 barA) feed gas mixture 644. The purified ethylene is output as retentate 957. The low per pass ethylene recovery minimizes the refrigeration requirements in the lean ethylene absorber. However, this is only economically feasible due to the unique downstream PSA units that selectively adsorb both the residual ethylene and unreacted CO from the electrolyzer as discussed below. In addition, the methane is selectively adsorbed from the tail gas stream allowing it to be recycled to the lean ethylene absorber as a CO stripping gas.

The upstream removal of higher boiling point (higher than ethylene) trace components using the water and oxygenate selective TSA is an important feature since it allows the lean ethylene absorber to produce the ethylene as a bottoms liquid product without contamination from higher boiling point liquids and without the need to vaporize and condense the ethylene as a distillate product. The methane purge for the LOA 955 can contain an appreciable amount of ethylene. In specific embodiments, an additional PSA (not pictured) using a silica gel, Cu/zeolite, or MOF adsorbent can be used to preferentially remove ethylene from the purge gas where it can be recycled back to the electrolyzer to further adjust the input stream composition and be later separated as a product gas. Methane separated in this manner can be separately valorized.

The tail gas permeate 956 is routed to a PSA 961 that, similar to the one described previously, adsorbs CO and ethylene while allowing hydrogen and nitrogen to pass through. In specific embodiments, the PSA 961 can also be configured to selectively adsorb any remaining methane as well. An additional PSA 965 can be used to separate out a high purity hydrogen 666 as a permeate similar to that described previously. The retentate tail gas stream 667 which is nitrogen-rich can be purged, discarded, thermally oxidized, or further purified as discussed previously. THE PSA 961 and the PSA 965 may be part of a hydrogen separator system 960.

In specific embodiments, system 900 can include a carbonyl removal subsystem 980 for portions of the recycled gas loop. The recycled tail gas from the tail gas compressor is routed to a feed product exchanger and a medium pressure steam trim heater to heat the recycle tail gas to 220° C. The preheated gas is routed to a carbonyl decomposition catalyst (e.g., Clariant Actisorb 400). The gas can be cooled after the decomposition catalyst using quench gas and the feed product exchanger to approximately 50° C. and routed to a polishing absorption bed consisting of a hydrophobic zeolite layer which only weakly adsorbs water (<25 kg water/100 kg dry absorbent at 25° C. with a water vapor pressure of 0.1 kPa), followed by a second layer of activated carbon. The polishing absorbent is used to remove any residual metal dust or residual metal carbonyls in the recycle gas. The polished recycle gas is routed to the electrolyzer.

In order to avoid formation of nickel and iron carbonyl in the feed gas to the electrolyzer, the recycle blowers and piping, carbonyl decomposition heat exchangers, vessels and piping (downstream of the feed product exchanger) need to be iron and nickel free material (e.g., brass or polytetrafluoroethylene (PTFE) or polypropylene lined). Silicon coatings (e.g., Dursan and Silcolloy by Silco Tek) may be used on stainless steel to prevent carbonyl formation in the CO containing gas service. Carbonyl removal from the recycle tail gas is important since even trace amounts of carbonyl from the interaction of the CO containing syngas with iron and nickel containing alloys in the piping and equipment can impact the life and performance of the catalysts in the electrolyzer.

Ethylene Conversion Efficiency Against Mol % of Carbon Monoxide in Input Stream

Figure 10:
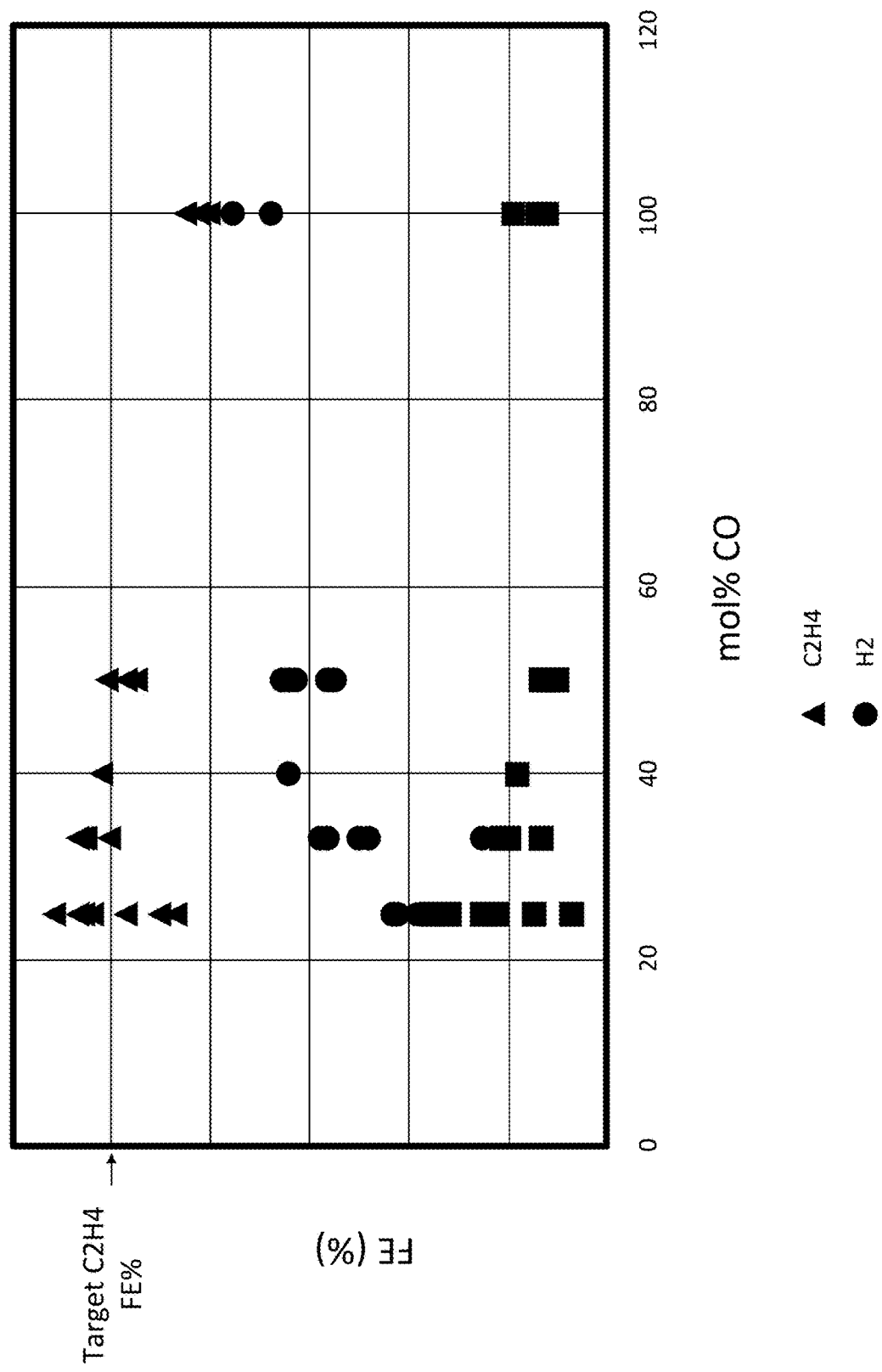
FIG. 10 provides a data plot of the faradaic efficiency in percentage of various chemicals produced in a carbon monoxide electrolyzer for different levels of mol percent (mol %) of carbon monoxide in the input stream to the electrolyzer in accordance with specific embodiments of the inventions disclosed herein.

As determined by the inventors, the mol % of oxocarbons in an oxocarbon electrolyzer needs to be maintained at a desired level to maintain a desired degree of performance. FIG. 10 illustrates the measured faradaic efficiency percentage for the conversion of carbon monoxide in a carbon monoxide electrolyzer into ethylene, hydrogen, and undesired carboxylates. The x-axis of the plot is the mol % of carbon monoxide in the input stream and each data point represents the average faradaic efficiency percentage for a given product during a test run of the electrolyzer for a fixed period. In the illustrated case, ethylene is the main desired product gas and can be recirculated to the carbon monoxide electrolyzer as a recycled product gas. In specific implementations, hydrogen can also be recirculated as a second product gas. As shown by the data, and in other experiments conducted by the inventors, the faradaic efficiency percentage of the electrolyzer drops off precipitously when the mol % of carbon monoxide in the input stream exceeds 50%. Accordingly, systems in accordance with the Present Application monitor, either indirectly or directly, the mol % of carbon monoxide in the electrolyzer input stream and increase the amount of product gas that is recirculated to the input stream if the mol % exceeds 50%.

Oxocarbon Electrolyzers

In the preceding examples, a carbon monoxide (CO) electrolyzer is used for a system including various separation stages. This section provides details of the possible variations of the CO electrolyzer. In embodiments of the present invention, the separation system is advantageously integrated with a CO electrolyzer comprising a cathode area where CO reduction takes place according to equation 1 below and an anode area where an oxidation reaction takes place on an oxidation substrate. The oxidation substrate can be water, dihydrogen gas, halides, organic waste or any other oxidation substrate. For example, the oxidation can involve water oxidation or dihydrogen oxidation according to equations 2 and 3 below respectively.

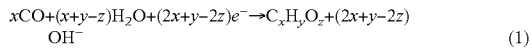

(1)

(2)

(3)

Both the CO and the oxidation substrate can be mixed with additional chemicals to alter the characteristics of the reactor and change the characteristics of the chemicals produced by the electrolyzer. The chemicals produced by the electrolyzer can vary in different embodiments of the invention. The chemicals can be separated using a separating element such as a trap for liquid chemicals on the anodic or cathodic output of the electrolyzer or a separating area between the cathode area and anode area which has its own output from the electrolyzer. The chemicals produced can be removed from the electrolyzer in solid or gaseous form and can be removed from the cathodic or anodic output streams on the cathode or anode outputs of the electrolyzer, or from a separate output from a separating layer. A single electrolyzer can produce chemicals in both gaseous and liquid forms simultaneously. Accordingly, the volume of chemicals generated in a step could include at least one of a volume of hydrocarbons, a volume of organic acids, a volume of alcohols, a volume of olefins and a volume of N-rich organic compounds, where the chemicals are in gaseous or liquid form. For example, the volume of generated chemicals could include a volume of gaseous ethylene and a volume of dissolved propionate. As another example, the volume of generated chemicals could include a volume of gaseous hydrocarbons and a volume of carboxylates. In a specific embodiment, the main targeted products are ethylene (in the gaseous product stream) and propionate/propionic acid (in the liquid product stream).

The CO electrolyzer used in accordance with this disclosure can comprise one or more electrocatalytic cells positioned on top of or next to one another to increase the surface available for the reaction. They can be stacked on top of one another, and such stacks can also be parallelized. These cells may be connected in series or in parallel. Many different cell and stack configurations can be used for the electrolyzers in accordance with this disclosure.

The electrolyzer assembly includes end plates, monopolar plates, rigid bars, a membrane electrode assembly (MEA) or any form of catalytic core, a flow field, and bipolar plates. Again, while the example of an MEA is being provided, this is only an example, and electrolyzers with any form of catalytic core can be used in accordance with the embodiments disclosed herein. Additionally, the stack includes an inlet and an outlet for an anodic stream, as well as an inlet for a cathodic stream and an outlet for the cathodic stream. The polar plates, such as a monopolar plate and a bipolar plate, can be part of the cells in the stack. The stack can also comprise gasketing, sealing of any shape and materials.

In an electrolysis stack, subsequent cells can be physically separated by bipolar plates (BPPs), that can ensure mechanical support for each of the electrolysis cells on each side of the BPP. The BPP can also ensure electrical series connection between subsequent electrolysis cells and introduce/remove the reactants/products respectively. At the end of the stack, only one side of the plate can be in contact with the terminal cell; it is then called a monopolar plate. At the extremities of the stack, current collectors can allow connection to an external power supply, which can also be used, among other elements, for electrical monitoring of the stack. The stack can be assembled within a stack casing allowing its mechanical support and compression, as well as provisioning and transporting the reactant and product streams to and from the stack. The stack casing can comprise end plates that ensure electrical isolation of the stack and provide the inlet and outlets for the reactant and product streams. Alternatively, insulator plates can be placed between an end plate and the monopolar plate to ensure electrical insulation of the stack versus the stack casing depending on the material of the end plate.

The CO electrolyzers can take as an input, a cathodic input stream (e.g., stream enriched in CO) and an anode input stream. The cathodic stream and anodic stream can flow through the stack from the inlets to the outlets and be distributed through the flow channels, such as a flow channel of each cell to each cathodic and anodic area separately. The anodic stream and cathodic stream would flow through separate channels on either side of the cell. Alternatively, at least one of the cathodic and anodic streams may be provided to each cell individually instead of through a connection crossing all the plates. In this case, each cell has a dedicated fluid inlet and outlet for this cathodic and/or anodic stream. The nature of the anodic stream can be determined by the nature of the targeted oxidation reaction (such as, but not limited to, water oxidation, dihydrogen oxidation, chloride oxidation, halide oxidation, hydrocarbon oxidation, waste organic oxidation). When electrically powered, the CO electrolyzer carries out the concomitant reduction of CO and oxidation of the chosen oxidation substrate to produce added-value chemicals such as hydrocarbons, organic acids and/or alcohols and/or N-containing organic products in the output cathodic stream separated from the anodic stream where the oxidation products are specifically collected. For example, the generating of chemicals using CO and the electrolyzer could involve supplying the volume of CO to a cathode area of the electrolyzer as a cathodic input fluid and supplying a volume of metal hydroxide solution to an anode area of the electrolyzer as an anodic input fluid.

In specific embodiments of the invention, the anode area could comprise an anodic catalyst layer able to oxidize a substance to produce a product and protons. The catalyst can comprise one or more: molecular species, single-metal-site heterogeneous compounds, metal compounds, carbon-based compounds, polymer electrolytes (also referred to as ionomers), metal-organic frameworks, metal-doped covalent organic frameworks or any other additives. The molecular species can be selected from metal porphyrins, metal phthalocyanines or metal bipyridine complexes. The metal compound can be under the form of metal nanoparticles, nanowires, nano powder, nanoarrays, nanoflakes, nanocubes, dendrites, films, layers or mesoporous structures. The single-metal-site compounds can comprise a metal-doped carbon-based material or a metal-N—C-based compound. Anodic catalyst species used for this purpose could include, but are not limited to, metals and/or ions of: Ir, Co, Cu, Ni, Fe, Pt, Rh, Re, Ru, Pd, Os, Mo and mixtures and/or alloys thereof. For example, the anodic catalyst could be Ni such that the electrolyzer assembly included a nickel-based anode. The polymer electrolyte can be selected out of the same materials as the one used for the described membranes. The carbon-based compounds can comprise carbon nanofibers, carbon nanotubes, carbon black, graphite, boron-doped diamond powder, diamond nanopowder, boron nitride or a combination thereof. The additives can be halide-based compounds including F, Br, I, and Cl. The additives can be specifically dedicated to modify hydrophobicity such as treatment with PTFE or carbon black.

The anodic catalyst may be deposited onto a gas diffusion layer or a porous transport layer or any other support that facilitates the diffusion of gas from the interface of the anode to a purified gas stream separated from the cathodic stream. The anode area could also include a gas diffusion layer with one or more separators such as but not limited to membranes, polymeric materials, or diaphragms, as described below.

In specific embodiments of the invention, the cathode area could comprise a catalyst layer able to reduce a substance (e.g., CO) to generate value-added hydrocarbons/alcohols/organic acids. The catalyst can comprise one or more: molecular species, single-metal-site heterogeneous compounds, metal compounds, carbon-based compounds, polymer electrolytes (also referred to as ionomers), metal-organic frameworks, metal-doped covalent organic frameworks or any other additives. The molecular species can be selected from metal porphyrins, metal phthalocyanines or metal bipyridine complexes. The metal compound can be under the form of metal nanoparticles, nanowires, nano powder, nanoarrays, nanoflakes, nanocubes, dendrites, films, layers or mesoporous structures. The single-metal-site compounds can comprise a metal-doped carbon-based material or a metal-N—C-based compound. The cathode catalyst may be made of a metal or metal ion from metals such as, but not limited to, Cu, Ag, Au, Zn, Sn, Bi, Ni, Fe, Co, Pd, Ir, Pt, Mn, Re, Ru, La, Tb, Ce, Dy or other lanthanides and mixtures and/or alloys thereof. For example, the cathodic catalyst could comprise Cu such that the electrolyzer assembly included a copper-based cathode. The carbon-based compounds can comprise carbon nanofibers, carbon nanotubes, carbon black, graphite, boron-doped diamond powder, diamond nanopowder, boron nitride or a combination thereof. The additives can be halide-based compounds including F, Br, I, and Cl. The additives can be specifically dedicated to modify hydrophobicity such as treatment with PTFE or carbon black. The cathode may further comprise a catalyst layer on a gas diffusion layer, a porous transport layer, or any other support, which encourages the diffusion of the gas from a stream to the surface of the catalyst, as well as allowing the release of non-reacted/product gases. The cathode area could also include a gas diffusion layer with one or more separators such as, but not limited to, membranes, polymeric materials, diaphragms, and inorganic materials on its borders as described below.

In specific embodiments of the invention, the porous support for either the anode area, the cathode area, or both, can be selected from carbon-based porous supports or metal-based porous material or a combination. The carbon-based porous support can be based on carbon fibers, carbon cloth, carbon felt, carbon fabric, carbon paper, molded graphite laminates and the like or a mixture thereof. The carbon-based porous support can be a gas diffusion layer with or without a microporous layer. Such carbon-based support can be in particular chosen from the following list: Sigracet 39AA, Sigracet 39BC, Sigracet 39BB, Sigracet 39BA, Sigracet 36AA, Sigracet 36BB, Sigracet 35BC, Sigracet 35BA, Sigracet 29BA, Sigracet 28BB, Sigracet 28AA, Sigracet 28BC, Sigracet 25BC, Sigracet 22BB, Sigracet 35BI, Toray papers, Toray THP-H-030, Toray TGP-H-060, Toray TGP-H-090, Toray TGP-H-120, Freudenberg H23C6, Freudenberg H15C13, Freudenberg H15C14, Freudenberg H14C10, Freudenberg H14CX483, Freudenberg H14CX653, Freudenberg H23C2, Freudenberg H23CX653, Freudenberg H24CX483, Freudenberg H23C6, Freudenberg H23C8, Freudenberg H24C5, Freudenberg H23C3, Avcarb MB-30, Avcarb GDS5130, AvCarb GDS2130, AvCarb GDS3250, AvCarb GDS3260, AvCarb GDS2230, Avcarb GDS2240, AvCarb GDS2255, AvCarb GDS2185, AvCarb 1071, AvCarb 1698, AvCarb1209, AvCarb 1185, AvCarb1186, AvCarb 7497, AvCarb T1819, AvCarb T1820, AvCarb T1824, AvCarb 1071, AvCarb 1698, AvCarb 1209, AvCarb 1185, AvCarb 1186, AvCarb 1186, AvCarb T1819, AvCarb T1820, AvCarb T1824, AvCarb EP40, AvCarb P75, AvCarb EP55, AvCarb EP40T, AvCarb P75T, AvCarb EP55T, AvCarb MGL190, AvCarb MGL280, AvCarbMGL370. The metal-based porous support can be selected from titanium, stainless steel, Ni, Cu or any other suitable metal and can be under the form of mesh, frit, foam or plate of any thickness or porosity.

In specific embodiments of the invention, the electrolyzer can include a separating element to separate specific generated chemicals from others. The separating element can be one or more traps on the cathodic and/or anodic outputs of the electrolyzer which separates liquid outputs from gaseous outputs. It can also be more complex systems known by those skilled in the art for the purpose of efficient product separation. The separating element can be a separating area between the anode area and the cathode area configured to separate the volume of generated chemicals from the electrolyzer. The separating area can be a separating layer. Efficient physical separation of the anode area and cathode area may allow easier separation of the gases released from each section of the reactor. The separator can be an ion-conducting polymeric separator, a non-ion conducting polymeric separators, a diaphragm, a ceramic-containing material, a non-charged separator scaffold, a mixed ceramic-organic compound separator, or any other separator. Separation may occur through the use of ion-exchange membranes, which favor the diffusion of either anions (in an anion-exchange membrane) or cations (in a cation-exchange membrane), or a bipolar membrane (including a mixture of cation- and anion-exchange membranes) or other types of separators, such as diaphragms, ceramic-containing materials (in particular mixed ceramic/organic compounds), or non-charged separator scaffolds. An anion-exchange membrane can comprise an organic polymer with positively charged functionality, such as, but not limited to, imidazolium, pyridinium or tertiary amines. This allows facile migration of negatively charged hydroxide ions (OH−) produced during CO reduction from the cathode to the anode. The use of this layer also prevents the crossover of other gases from the cathode to the separating layer. Cation-exchange membranes can comprise an organic polymer with negatively charged functionality such as, but not limited to, sulfonate groups. Diaphragms or non-charged separators can be materials derived from insulating materials which may be charged with an ion-conducting electrolyte to facilitate charge transfer between electrodes. Ceramic-containing materials may be a purely ceramic or mixed polymer and ceramic material. Ceramic-polymer mixes can reach higher temperatures than purely organic polymers and may take advantage of ion-exchange functionality in the polymer to pass charge between electrodes.

In specific embodiments of the invention, the system can include an electrolyte that will facilitate the transportation of ions and provide ions that promote the reactions. In particular, the electrolyte may be a concentrated alkaline solution such as a solution of hydroxide-containing salt such as but not limited to potassium, sodium or cesium hydroxide with concentrations such as 0.01 molarity (M), 0.05 M, 0.1 M, 0.2 M, 0.5 M, 1 M, 2 M, 3 M, 4 M, 5 M, 6 M, 7 M, 8 M, 9 M and 10 M. The use of concentrated alkaline solution brings down the energy requirement of the overall reaction. Alkali metal cations (such as Li, Na, K, Cs, Rb) may be used as counter-cations.

In specific embodiments of the invention, the flow field can comprise a ladder, single or multiple serpentines, interdigitated patterns, pillars, bio-inspired leaf-like shapes or a mixture thereof. An electrolysis cell can also include polar plates as further discussed in this disclosure.

As an example, a CO electrolyzer may comprise a cathode comprising a gas-diffusion layer and a copper-based catalyst, and the anode may comprise a nickel material of any shape (such as but not limited to a foam, a mesh, a deposit onto a conductive porous transport layer (PTL), etc.). In this case, the CO reduction products include one or more of the following: ethylene ($C_2H_4$), ethanol ($C_2H_5OH$), acetic acid ($CH_3COOH$), propylene ($C_3H_6$), propanol ($C_3H_8O$), oxalic acid (COOH—COOH), propionate ($C_2H_3COOH$), glyoxylic acid (COH—COOH) produced according to the following CO reduction reactions:

In neutral/alkaline conditions:

$$2CO + 6H_2O + 8e^- \rightarrow CH_2CH_2 + 8OH^- \tag{4}$$

$$2CO + 7H_2O + 8e^- \rightarrow CH_3CH_2OH + 8OH^- \tag{5}$$

$$2CO + 4H_2O + 4e^- \rightarrow CH_3COOH + 4OH^- \tag{6}$$

$$3CO + 7H_2O + 8e^- \rightarrow C_2H_5COOH + 8OH^- \tag{7}$$

$$3CO + 9H_2O + 12e^- \rightarrow C_3H_6 + 12OH^- \tag{8}$$

$$3CO + 10H_2O + 12e^- \rightarrow C_3H_8O + 12OH^- \tag{9}$$

In specific embodiments, the CO stream is mixed with other gas or liquid compounds to generate higher added value products at the cathode. In one such embodiment, imines, amines, nitrogen oxides or ammonia are added to react with CO, or an intermediate formed during its reduction, to form amide bonds or N-rich organic compounds, such as amino acids or urea. An example of such a reaction is:

$$2CO + 3H_2O + NH_3 + 4e^- \rightarrow CH_3CONH_2 + 4OH^- \text{ in neutral/alkaline conditions} \tag{10}$$

In specific embodiments, the oxidation reaction at the anode is selected from the group consisting of reactions undertaken in an acidic environment and reactions undertaken in an alkaline environment such as but not limited to anodic reactions in an acidic environment such as:

$$2H_2O \rightarrow O_2 + 4H^+ + 4e^- \tag{11}$$

$$H_2 \rightarrow 2H^+ + 2e^- \tag{12}$$

$$Cl^- \rightarrow Cl_2 + 2e^- \tag{13}$$

$$Br^- \rightarrow Br_2 + 2e^- \tag{14}$$

$$I^- \rightarrow I_2 + 2e^- \tag{15}$$

$$C_3H_8O_3 \text{ (glycerol)} \rightarrow C_3H_6O_3 \text{ (glyceraldehyde)} + 2H^+ + 2e^- \tag{16}$$

$$C_3H_8O_3 \text{ (glycerol)} + H_2O \rightarrow C_3H_5O_4^- \text{ (glycerate)} + 5H^+ + 4e^- \tag{17}$$

$$C_3H_8O_3 \text{ (glycerol)} + 3/2 H_2O \rightarrow 3/2 C_2H_3O_3^- + 13/2 H^+ + 5e^- \tag{18}$$

$$C_3H_8O_3 \text{ (glycerol)} + 3H_2O \rightarrow 3HCOO^- \text{ (formate)} + 11H^+ + 8e^- \tag{19}$$

$$C_3H_8O_3 \text{ (glycerol)} + 3H_2O \rightarrow 3/2 C_2O_4^{2-} + 14H^+ + 11e^- \tag{20}$$

and anodic reactions in neutral/alkaline environments such as:

$$4OH^- \rightarrow O_2 + 2H_2O + 4e^- \tag{21}$$

$$H_2 + 2OH^- \rightarrow 2H_2O + 2e^- \tag{22}$$

$$Cl^- \rightarrow Cl_2 + 2e^- \tag{23}$$

$$Br^- \rightarrow Br_2 + 2e^- \tag{24}$$

$$I^- \rightarrow I_2 + 2e^- \tag{25}$$

$$C_3H_8O_3 \text{ (glycerol)} + 2OH^- \rightarrow C_3H_6O_3 \text{ (glyceraldehyde)} + 2H_2O + 2e^- \tag{26}$$

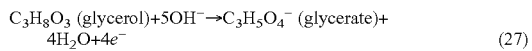

$$C_3H_8O_3 \text{ (glycerol)} + 5OH^- \rightarrow C_3H_5O_4^- \text{ (glycerate)} + 4H_2O + 4e^- \quad (27)$$

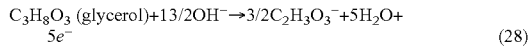

$$C_3H_8O_3 \text{ (glycerol)} + 13/2OH^- \rightarrow 3/2C_2H_3O_3^- + 5H_2O + 5e^- \quad (28)$$

$$C_3H_8O_3 \text{ (glycerol)} + 11OH^- \rightarrow 3HCOO^- \text{ (formate)} + 8H_2O + 8e^- \quad (29)$$

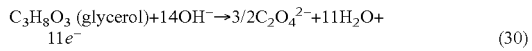

$$C_3H_8O_3 \text{ (glycerol)} + 14OH^- \rightarrow 3/2C_2O_4^{2-} + 11H_2O + 11e^- \quad (30)$$

In specific embodiments of the invention, the CO electrolyzer includes one or more membranes chosen among anion-exchange membranes (such as, but not limited to, commercial Ionomr®, Orion®, Sustainion®, Piperion®, ionomer anion-exchange membranes), proton-exchange membranes (such as but not limited to Nafion®, Aquivion® or commercial membranes), bipolar membranes (such as, but not limited to, Fumasep® FBM and Xion®). In specific embodiments of the invention, the membrane in an anion-exchange membrane is prepared using N-bearing monomers.

In specific embodiments of the invention, the electrolyzer can include a separating layer. In this case, the CO electrolyzer comprises a central separating layer in which an electrolyte fluid is circulated allowing the collection of liquid carbon-monoxide-reduction products that migrate from the cathode toward the central separating layer. In specific embodiments, the central separating layer is either separated from the cathode by an anion-exchange membrane or from the anode by a cation-exchange membrane, or both membranes are present. In this example, useful products can be harvested both from the liquid stream from the separating layer and a gaseous stream from the cathode output. For example, the CO could be used by the electrolyzer to produce one or more of the following: ethylene ($C_2H_4$), ethanol ($C_2H_5OH$), acetic acid ($CH_3COOH$), propylene ($C_3H_6$), propanol ($C_3H_8O$) or propionic acid ($C_2H_5COOH$). In a specific embodiment, the main targeted product is ethylene (in the gaseous product stream). In another specific embodiment, the main targeted products are ethylene (in the gaseous product stream) and propionate/propionic acid (in the liquid product stream). In another specific embodiment, the main targeted products are ethylene (in the gaseous product stream) and acetic acid/acetate (in the liquid product stream). The liquid products may need to be separated from the anolyte stream through processes including nanofiltration and/or bipolar membrane electrodialysis or through the generation of acids/bases through processes such as the chlor-alkali process.

In specific embodiments of the invention, a porous diaphragm can be used in the electrolyzer as a separation element to achieve separation. The diaphragm can be saturated with an electrolyte which allows ions to cross between the cathode and anode.

Different systems and methods for gas separation in oxocarbon electrolyzers are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

What is claimed is:

1. A method comprising:
   supplying an oxocarbon to an input stream of a cathode chamber of an oxocarbon electrolyzer;
   converting the oxocarbon to a product gas in the cathode chamber;
   obtaining an output stream, with the product gas and residual oxocarbon, from the oxocarbon electrolyzer;
   recycling a portion of the product gas, from the output stream, to the input stream; and
   supplying the output stream to a first separator;
   wherein (i) the first separator is a membrane separator, a pressure swing adsorption separator, a temperature swing adsorption separator, a cryogenic separator, or a lean oil absorption separator; (ii) the first separator comprises two or more stages, wherein each separator stage can be a same or different type; and (iii) the product gas is recycled from the output stream between two stages in the two or more stages.

2. The method of claim 1, further comprising:
   controlling the portion of the product gas that is recycled to the input stream of the cathode chamber to maintain less than 50 mole percentage of the oxocarbon in the input stream.

3. The method of claim 1, wherein:
   the mole percentage of the oxocarbon in the input stream is less than 50 and the mole percentage of product gas in the input stream is greater than 5.

4. The method of claim 1, further comprising:
   controlling the portion of the product gas that is recycled to the input stream to maintain higher than 50 mole percentage of the product gas at an input to the first separator.

5. The method of claim 1, wherein:
   the product gas is additionally recycled from the output stream prior to the first separator.

6. The method of claim 1, wherein:
   the oxocarbon is carbon monoxide;
   the product gas is ethylene; and
   the oxocarbon electrolyzer is a carbon monoxide electrolyzer.

7. The method of claim 1, wherein:
   the oxocarbon is carbon dioxide;
   the product gas is carbon monoxide; and
   the oxocarbon electrolyzer is a carbon dioxide electrolyzer.

8. The method of claim 1, wherein:
   the converting of the oxocarbon to the product gas in the cathode chamber creates at least one additional product gas; and
   the portion of the product gas is recycled with the at least one additional product gas.

9. The method of claim 8, further comprising:
controlling the portion of the product gas and at least one additional product gas that are recycled to the input stream of the cathode chamber to: (i) maintain less than 50 mole percentage of the oxocarbon in the input stream; and (ii) maintain greater than 50 combined mole percentage of product gas and at least one additional product gas in the input stream.

10. The method of claim 8, wherein:
the oxocarbon is carbon monoxide;
the product gas is ethylene;
the at least one additional product gas is hydrogen; and
the oxocarbon electrolyzer is a carbon monoxide electrolyzer.

11. The method of claim 8, wherein:
the oxocarbon is carbon dioxide;
the product gas is carbon monoxide;
the at least one additional product gas includes one or more of hydrogen and ethylene; and
the oxocarbon electrolyzer is a carbon dioxide electrolyzer.

12. The method of claim 1, wherein:
the first stage of the first separator is a gas/liquid separator selected from the group comprising: a condenser, a cooler, a liquid trap, a knockout drum, and a centrifugal cyclone separator.

13. A system comprising:
an oxocarbon electrolyzer having a cathode chamber, wherein the oxocarbon electrolyzer is configured to reduce an oxocarbon in an input stream to a product gas;
a supply configured to introduce the oxocarbon into the input stream;
an output of the oxocarbon electrolyzer with an output stream, wherein the output stream includes the product gas and residual oxocarbon;
a recycle conduit configured to recycle a portion of the product gas, from the output stream, to the input stream; and
a first separator configured to separate product gas from the output stream;
wherein (i) the first separator is one of: a membrane separator, a pressure swing adsorption separator, a temperature swing adsorption separator, a cryogenic separator or a lean oil absorption separator, (ii) the first separator comprises two or more stages, and (iii) the recycle conduit is configured to recycle a portion of the product gas from between two stages of the two or more stages in the first separator.

14. The system of claim 13, further comprising:
a sensor arrangement configured to monitor, using one of indirect and direct monitoring, a mole percentage of the oxocarbon in at least one of the input stream and the output stream; and
a control system configured to adjust the portion of the product gas being recycled to the cathode chamber input to maintain less than 50 mole percent of the oxocarbon in the input stream.

15. The system of claim 13, wherein the system is configured to monitor, using one of indirect and direct monitoring, a gas composition of the input stream and to maintain:
less than 50 mole percent of the oxocarbon in the input stream; and
greater than 5 mole percent of the product gas in the input stream.

16. The system of claim 13, further comprising:
a control subsystem configured to regulate the portion of product gas so as to maintain higher than 50 mole percent of the product gas at an input to the first separator.

17. The system of claim 13, wherein:
the oxocarbon is carbon monoxide,
the product gas is ethylene, and
the oxocarbon electrolyzer is a carbon monoxide electrolyzer.

18. The system of claim 13, wherein:
the oxocarbon is carbon dioxide,
the product gas is carbon monoxide, and
the oxocarbon electrolyzer is a carbon dioxide electrolyzer.

19. The system of claim 13, wherein:
wherein the first stage of the first separator is a gas/liquid separator selected from the group comprising: a condenser, a cooler, a liquid trap, a knockout drum, and a centrifugal cyclone separator.

20. A method comprising:
supplying an oxocarbon to an input stream of a cathode chamber of an oxocarbon electrolyzer;
reducing the oxocarbon at a cathode electrode of the oxocarbon electrolyzer under conditions effective to produce a first product gas and a second product gas in the cathode chamber;
obtaining an output stream from the oxocarbon electrolyzer comprising the first product gas, the second product gas, and residual oxocarbon;
supplying the first product gas, the second product gas, and the residual oxocarbon to a gas/liquid separator system;
recycling a first portion, of the first product gas and the second product gas, from one or more outputs of the gas/liquid separator system to the input stream; and
supplying a second portion, of the first product gas and the second product gas, from the one or more outputs of the gas/liquid separator system to a gas separator.

21. A method comprising:
supplying an oxocarbon to an input stream of a cathode chamber of an oxocarbon electrolyzer;
converting the oxocarbon to a product gas in the cathode chamber;
obtaining an output stream, with the product gas and residual oxocarbon, from the oxocarbon electrolyzer;
supplying the output stream to a gas/liquid separator; and
recycling a portion of the product gas, from a gas output stream of the gas/liquid separator, to the input stream;
wherein the output stream further comprises one or more liquid products; and the product gas is recycled from the gas output stream of the gas/liquid separator directly after the one or more liquid products have been removed from the output stream by the gas/liquid separator.

22. The method of claim 21, wherein the gas/liquid separator is a cooler or condenser.

23. The method of claim 21, wherein:
the one or more liquid products comprise alcohols or carboxylates; and
the recycling of a portion of the product gas, from the output stream, to the input stream decreases the selectivity of reactions in the cathode chamber that create alcohols or carboxylates.

24. The method of claim 21, further comprising:
supplying a second portion of the product gas, from the gas output stream of the gas/liquid separator, to at least one gas separator.

25. A system comprising:
an oxocarbon electrolyzer having a cathode chamber, wherein the oxocarbon electrolyzer is configured to reduce an oxocarbon in an input stream to a product gas;
a supply configured to introduce the oxocarbon into the input stream;
an output of the oxocarbon electrolyzer with an output stream, wherein the output stream includes the product gas, residual oxocarbon, and one or more liquid products;
a gas/liquid separator configured to separate the output stream into a gas stream containing the product gas and the residual oxocarbon, and a liquid stream containing the one or more liquid products; and
a recycle conduit configured to recycle a portion of the product gas, from the gas stream, to the input stream of the oxocarbon electrolyzer, wherein the recycle conduit is positioned directly after the gas stream output of the gas/liquid separator.

26. The system of claim 25, wherein the gas/liquid separator is a cooler or condenser.

27. The system of claim 25, further comprising:
a gas separator configured to accept a second portion of the product gas, from the gas stream.

* * * * *